(12) United States Patent
Kim et al.

(10) Patent No.: US 11,425,339 B2
(45) Date of Patent: Aug. 23, 2022

(54) ARTIFICIAL INTELLIGENCE DEVICE AND METHOD THEREOF

(71) Applicant: LG ELECTRONICS INC., Seoul (KR)

(72) Inventors: Hyongguk Kim, Seoul (KR); Sangyoun Shin, Seoul (KR); Darae Kim, Seoul (KR); Seokjun Yoon, Seoul (KR); Jihyun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/119,894

(22) Filed: Dec. 11, 2020

(65) Prior Publication Data
US 2021/0185283 A1 Jun. 17, 2021

Related U.S. Application Data

(60) Provisional application No. 62/946,906, filed on Dec. 11, 2019.

(30) Foreign Application Priority Data

Jun. 4, 2020 (KR) .................. 10-2020-0067463
Nov. 4, 2020 (KR) .................. 10-2020-0146148

(51) Int. Cl.
*H04N 7/18* (2006.01)
*G08B 3/10* (2006.01)
(Continued)

(52) U.S. Cl.
CPC ........... *H04N 7/185* (2013.01); *G05B 13/027* (2013.01); *G06K 9/6256* (2013.01); *G06N 3/04* (2013.01);
(Continued)

(58) Field of Classification Search
CPC ...... H04N 7/185; H04N 7/186; G05B 13/027; G06K 9/00624; G06K 9/6256;
(Continued)

(56) References Cited

U.S. PATENT DOCUMENTS

2005/0007451 A1* 1/2005 Chiang ............ G08B 13/19634
348/143
2005/0053017 A1* 3/2005 Komiya ................. G08C 17/02
370/255
(Continued)

FOREIGN PATENT DOCUMENTS

KR 10-2015-0010854 1/2015
KR 10-2018-0055580 5/2018

OTHER PUBLICATIONS

Korean Intellectual Property Office Application No. 10-2020-0146148, Office Action dated May 31, 2022, 4 pages.

*Primary Examiner* — Jared Walker
(74) *Attorney, Agent, or Firm* — Lee, Hong, Degerman, Kang & Waimey PC

(57) ABSTRACT

Disclosed herein is an artificial intelligence device for providing connection between a plurality of home devices, including a communication interface configured to receive a visitor image from a door locking device including a door camera for photographing a visitor, and a processor configured to obtain visitor information output from a visitor recognition model by inputting the visitor image to the visitor recognition model and select a home device to receive the visitor image and the visitor information from among the plurality of home devices, wherein the communication interface transmits the visitor image and the visitor information to the selected home device.

18 Claims, 31 Drawing Sheets

(51) Int. Cl.
*G06V 20/00* (2022.01)
*G06K 9/62* (2022.01)
*G06N 3/04* (2006.01)
*G08C 17/02* (2006.01)
*G05B 13/02* (2006.01)

(52) U.S. Cl.
CPC ............... *G06V 20/00* (2022.01); *G08B 3/10* (2013.01); *G08C 17/02* (2013.01)

(58) Field of Classification Search
CPC .......... G06K 9/6201; G06N 3/04; G06N 3/08; G08B 3/10; G08B 13/1672; G08B 13/19613; G08C 17/02
See application file for complete search history.

(56) References Cited

U.S. PATENT DOCUMENTS

| | | | | |
|---|---|---|---|---|
| 2015/0156031 A1* | 6/2015 | Fadell | .................. | G08B 19/005 700/276 |
| 2018/0357870 A1* | 12/2018 | Siminoff | .......... | G08B 13/19606 |
| 2019/0087646 A1* | 3/2019 | Goulden | ............ | G06K 9/00255 |
| 2019/0253271 A1* | 8/2019 | Shi | ..................... | G05D 23/1928 |

* cited by examiner

FIG. 8
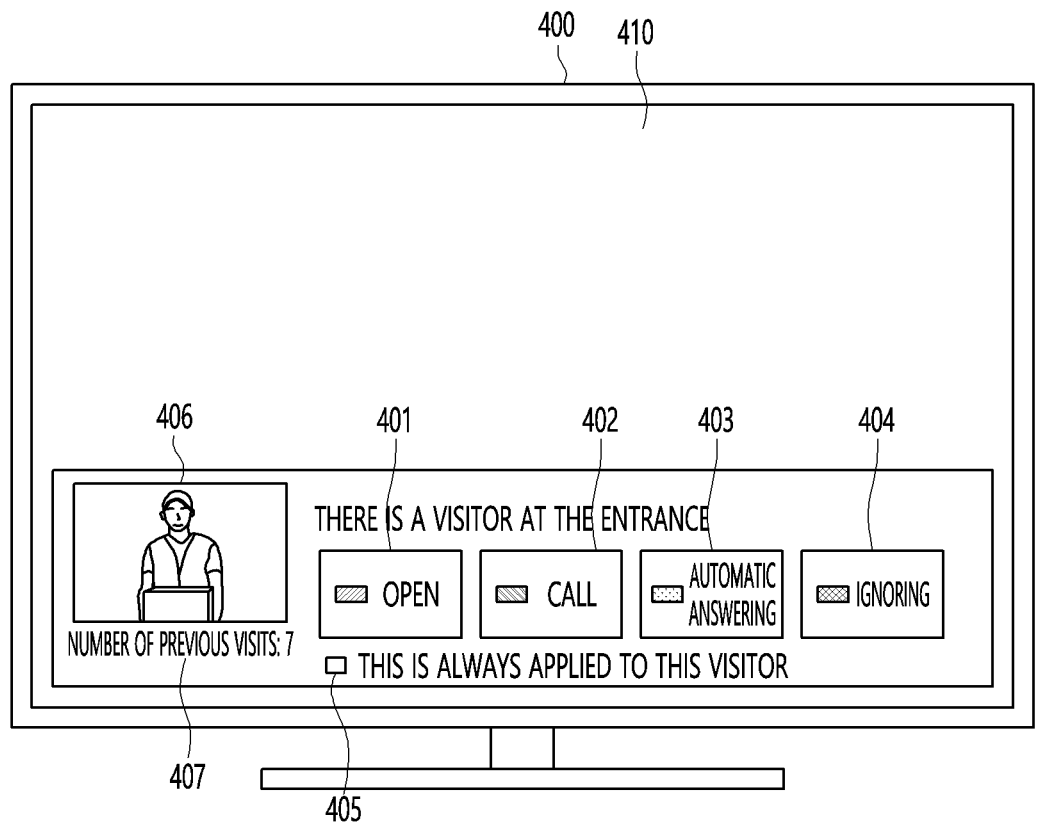
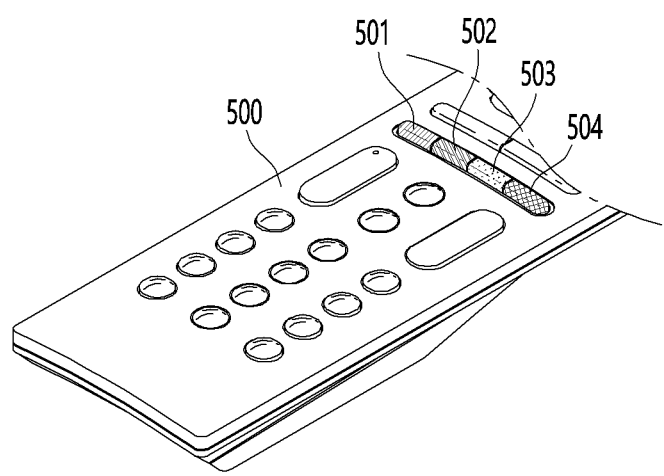

FIG. 10
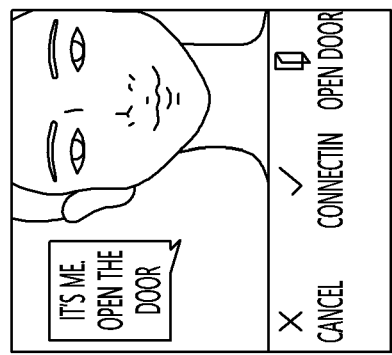
1001
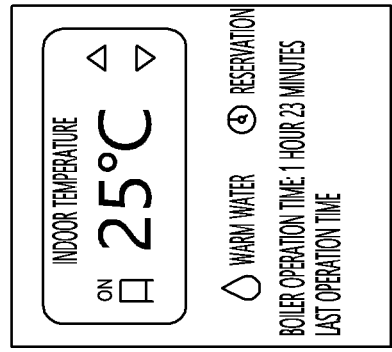
1002
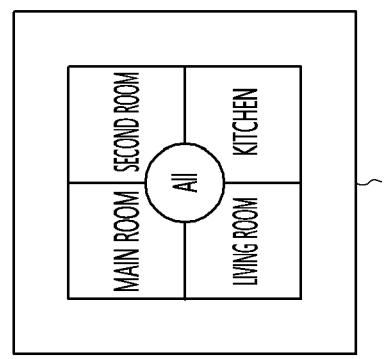
1003
1007
ONE MESSAGE HAS ARRIVED FROM MOM
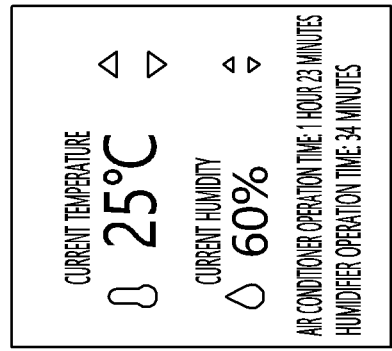
1004
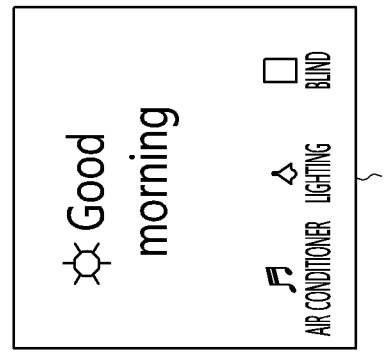
1005
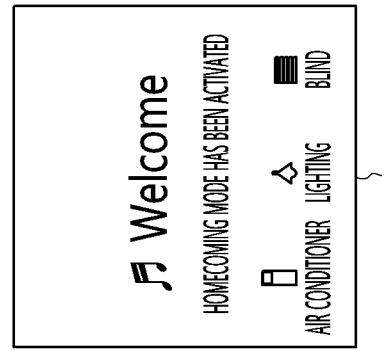
1006

FIG. 11
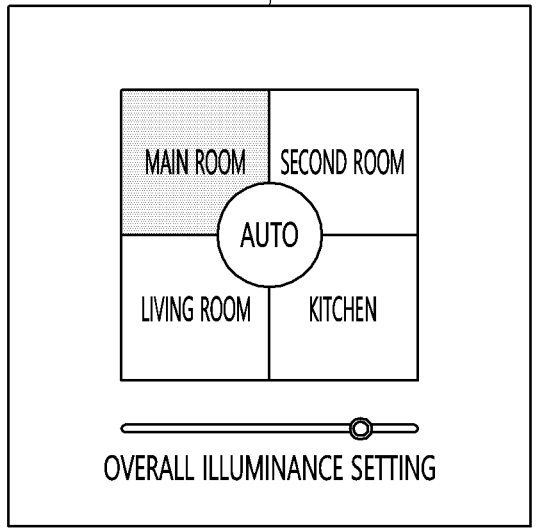
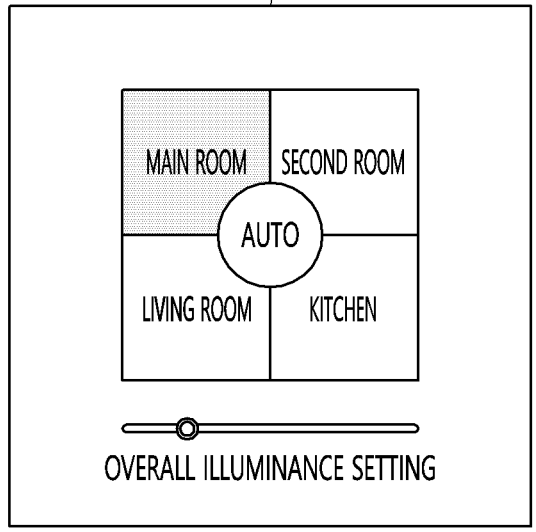
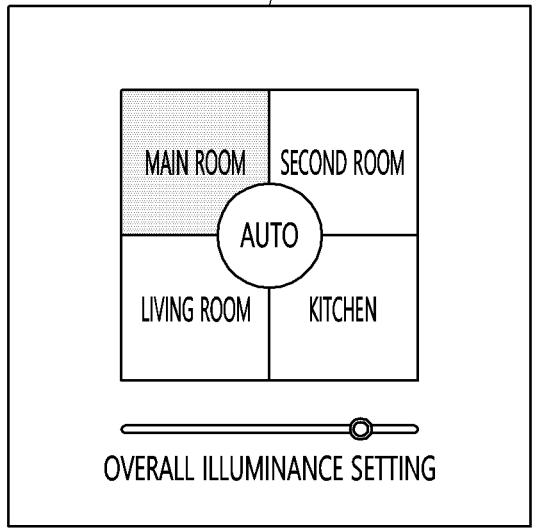
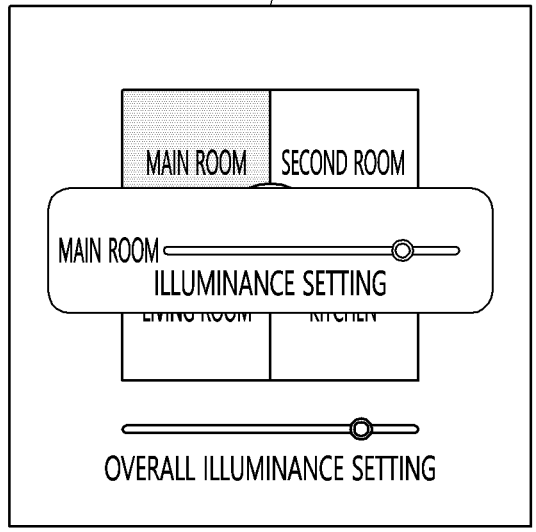

FIG. 33

DEC 27 (FRI) 10:32 AM — 2806

< BILLING OF THIS MONTH

TOTAL BILLED FOR OCTOBER
PAYMENT DEADLINE ON OCTOBER 26, 2020     232,000WON

| ADMINISTRATIVE EXPENSES | EXTERNAL SERVICE | OTHER |
|---|---|---|

< OCTOBER >   (MONTHLY COMPARISON)
              (COMPARE BY GENERATION)

| | |
|---|---|
| FACILITY MANAGEMENT FEE ▼ | 30,000WON |
| HEATING ▼ | 35,000WON |
| ELECTRICITY ▼ | 35,000WON |
| GAS CHARGES ▼ | 15,000WON |

- - - - - - - - - - - - - - - - - - - - - - - - - - - - - - - - -

| | |
|---|---|
| CURRENT MONTHLY CHARGE | 172,000WON |
| UNPAID AMOUNT IN THE PREVIOUS MONTH | 0WON |
| TOTAL BILLING COST | 172,000WON |
| COMPARED TO THE PREVIOUS MONTH | 200WON |

PAY NOW

FIG. 34

DEC 27 (FRI) 10:32 AM —2806

< PAY NOW (REPRESENTATIVE ACCOUNT)
WOORI BANK
1002-123-456780
AUTOMATIC DEBIT IS SET
ON THE 25TH OF EVERY MONTH

OTHER ACCOUNT INFORMATION

| | | |
|---|---|---|
| ☐ ADMINISTRATIVE EXPENSES | | 172,000WON |
| ☑ EXTERNAL SERVICE | | 50,000WON |
| ☑ OTHER | | 10,000WON |

TOTAL PAYMENT AMOUNT       60,000WON

PAY

ARTIFICIAL INTELLIGENCE DEVICE AND METHOD THEREOF

CROSS-REFERENCE TO RELATED APPLICATIONS

Pursuant to 35 U.S.C. § 119, this application claims the benefit of earlier filing date and right of priority to Korean Application No. 10-2020-0067463, filed on Jun. 4, 2020, and 10-2020-0146148, filed on Nov. 4, 2020, and also claims the benefit of U.S. Provisional Application No. 62/946,906 filed on Dec. 11, 2019, the contents of which are all incorporated by reference herein in their entirety.

BACKGROUND

The present disclosure relates to an artificial intelligence device and a method thereof.

Artificial intelligence is a field of computer engineering and information technology for researching a method of enabling a computer to do thinking, learning and self-development that can be done by human intelligence, and means that a computer can imitate a human intelligent action.

In addition, artificial intelligence does not exist in itself but has many direct and indirect associations with the other fields of computer science. In particular, today, attempts to introduce artificial intelligent elements to various fields of information technology to deal with issues of the fields have been actively made.

Meanwhile, technology for recognizing and learning a surrounding situation using artificial intelligence and providing information desired by a user in a desired form or performing a function or operation desired by the user is actively being studied.

An electronic device for providing such operations and functions may be referred to as an artificial intelligence device.

Meanwhile, recently, there are a number of artificial devices located inside and outside home, offices, transportation facilities, cultural facilities, sports facilities or various facilities.

Each device may obtain or generate a variety of data.

Accordingly, there is an increasing need to share data obtained by each device with another device and to manage the data.

In addition, there is an increasing need to connect devices such that data is shared between devices or controlled by the devices.

Meanwhile, recently, with development of IT technology, IT technologies are being grafted onto the daily lives of users. However, IT services related to a user's residence are still insufficient.

For example, a user who has moved to a specific area needs a lot of time to learn information related to the area and may not properly use services provided in their residential area. In addition, since a variety of information associated with people's residence are being delivered through paper prints or paper mails, there is a need for improvement.

SUMMARY

An object of the present disclosure devised to solve the above-described problems and the other problems.

Another object of the present disclosure devised to solve the problem lies in an artificial intelligence device for providing connection among a plurality of home devices, and a method thereof Another object of the present disclosure devised to solve the problem lies in an artificial intelligence device applicable to a smart home system, and a method thereof Another object of the present disclosure devised to solve the problem lies in an artificial intelligence device capable of reinforcing entry/exit security by providing connection between devices, and a method thereof.

Another object of the present disclosure devised to solve the problem lies in an artificial intelligence device capable of enabling a user to conveniently control each device by providing connection between devices, and a method thereof Another object of the present disclosure devised to solve the problem lies in an artificial intelligence device capable of enabling a user to conveniently control each device by providing connection between devices, and a method thereof.

According to an embodiment of the present disclosure, provided is an artificial intelligence device for providing connection between a plurality of home devices, including a communication interface configured to receive a visitor image from a door locking device including a door camera for photographing a visitor, and a processor configured to obtain visitor information output from a visitor recognition model by inputting the visitor image to the visitor recognition model and select a home device to receive the visitor image and the visitor information from among the plurality of home devices, wherein the communication interface transmits the visitor image and the visitor information to the selected home device.

In addition, provided is a method of providing connection between a plurality of home devices, including receiving a visitor image from a door locking device including a door camera for photographing a visitor, obtaining visitor information output from a visitor recognition model by inputting the visitor image to the visitor recognition model, selecting a home device to receive the visitor image and the visitor information from among the plurality of home devices, and transmitting the visitor image and the visitor information to the selected home device.

According to the embodiment of the present disclosure, it is possible to integrally control a plurality of home devices by connecting the plurality of home devices.

In addition, according to various embodiments of the present disclosure, it is possible to enhance entry/exit security against a visitor, by connecting a plurality of home devices.

In addition, according to various embodiments of the present disclosure, it is possible to check a member using information collected by a plurality of home devices and to detect abnormal activity of the member.

BRIEF DESCRIPTION OF THE DRAWINGS

FIG. 8 is a view showing a home security interface according to an embodiment of the present disclosure.

FIG. 10 is a view showing an example of an integrated information interface according to an embodiment of the present disclosure.

FIG. 11 is a view showing an example of a lighting control interface according to an embodiment of the present disclosure.

FIGS. 33 and 34 are views illustrating a cost information interface according to an embodiment of the present disclosure.

DETAILED DESCRIPTION OF THE EMBODIMENTS

Figure 1:
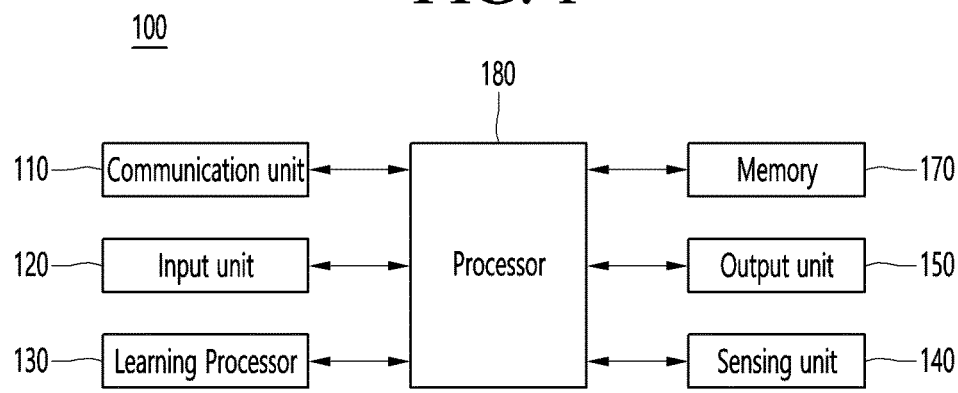
FIG. 1 illustrates an AI apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
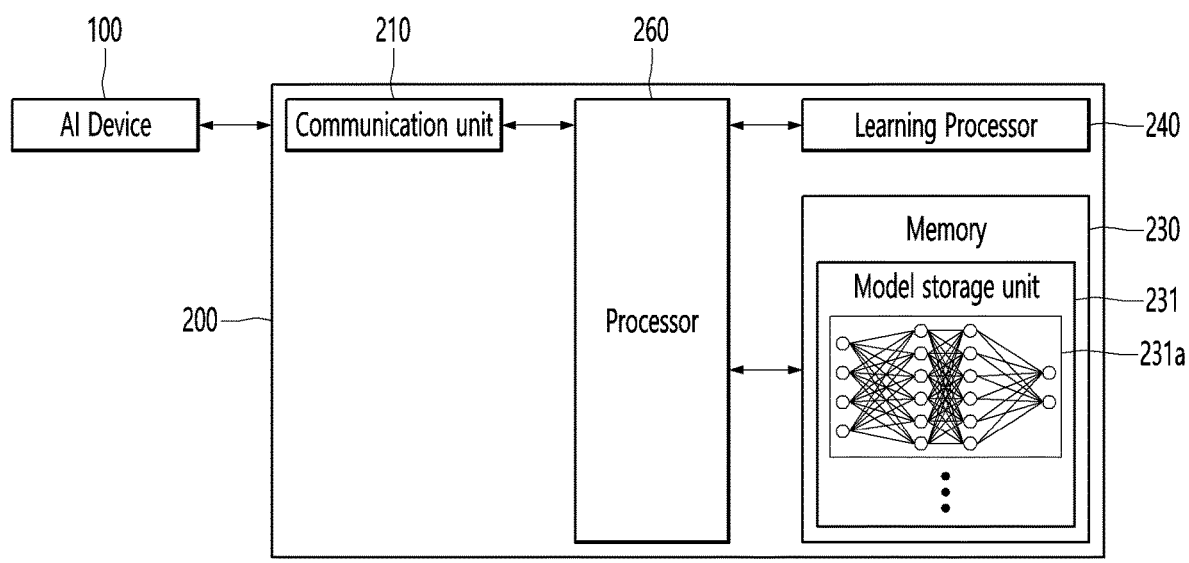
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
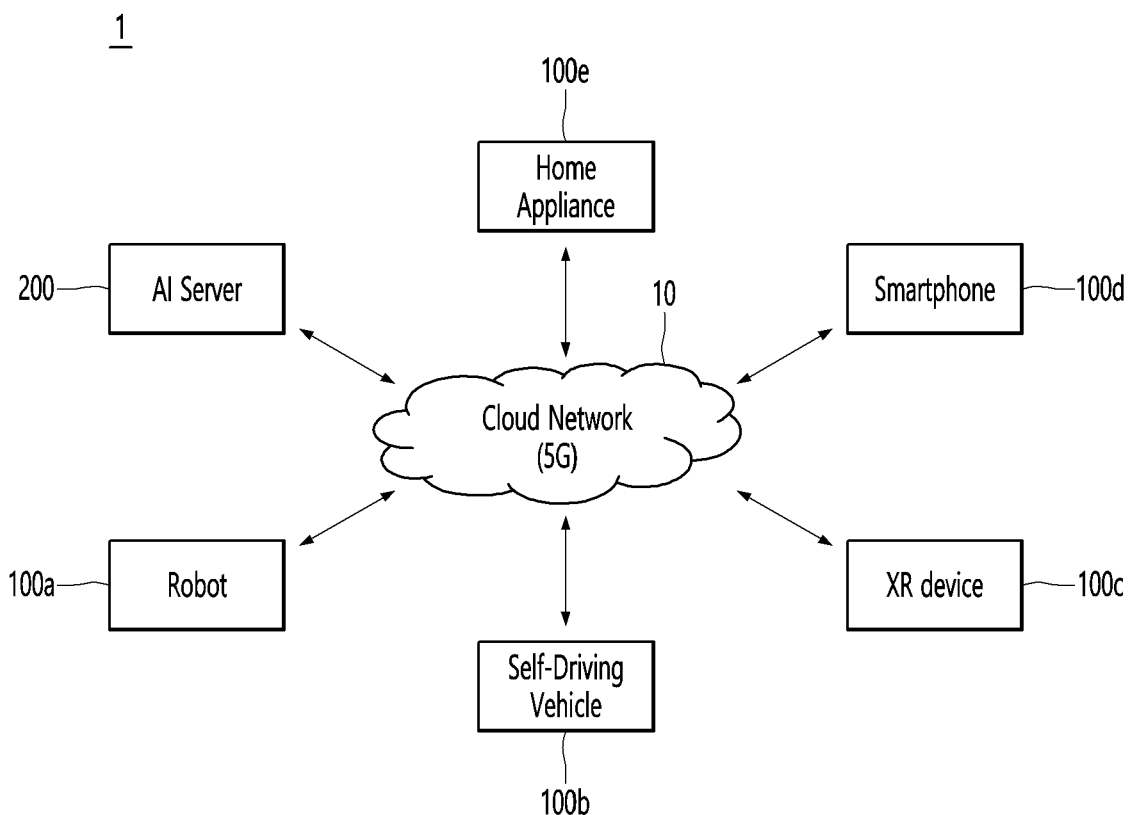
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI 30 Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driver such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driver based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot +Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driver of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
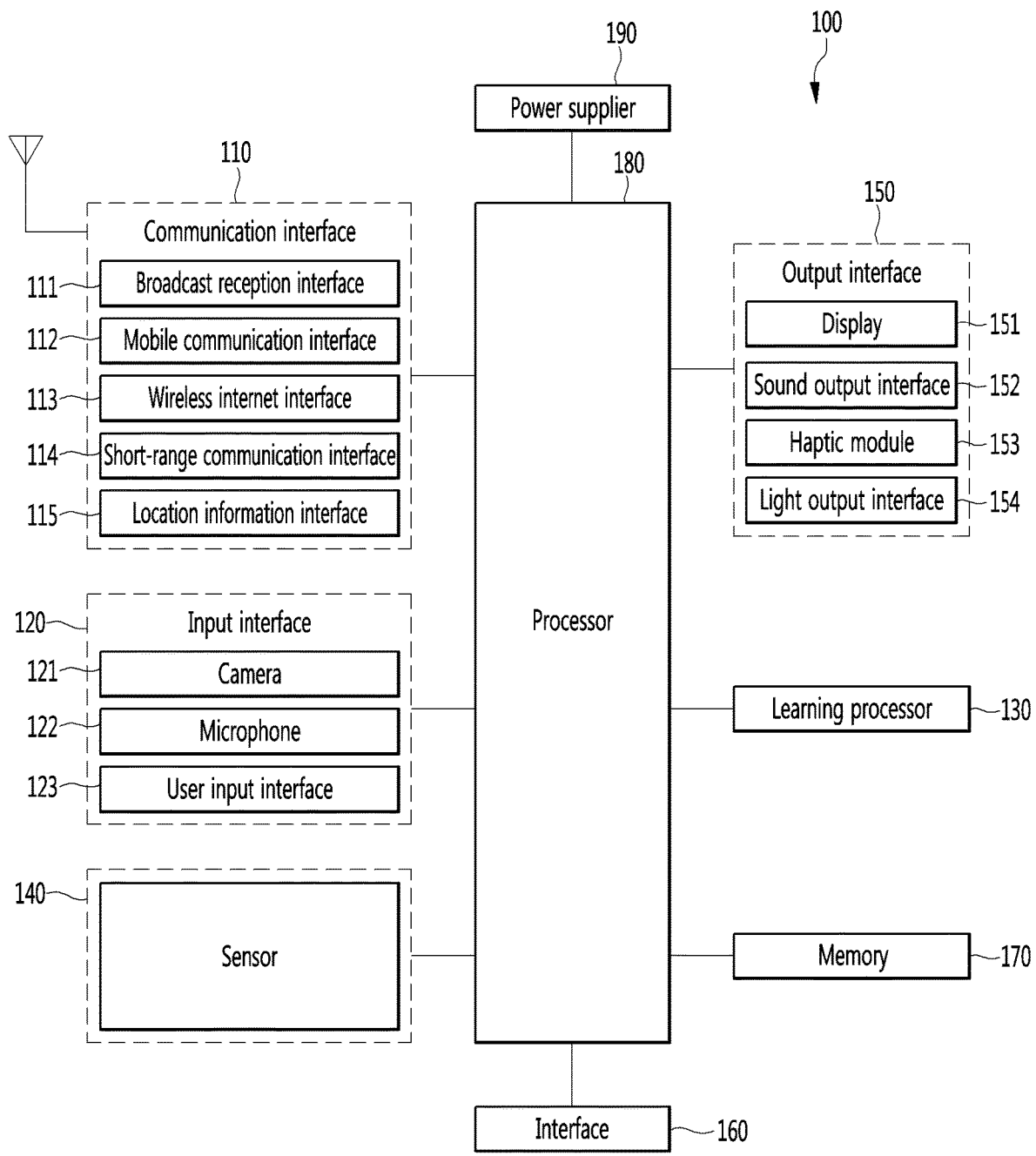
FIG. 4 is a block diagram illustrating an artificial intelligence device according to the present disclosure.

FIG. 4 is a block diagram illustrating an artificial intelligence device according to the present disclosure.

A description overlapping FIG. 1 will be omitted.

The communication interface 110 may include at least one of a broadcast reception module 111, a mobile communication module 112, a wireless Internet module 113, a short-range communication module 114 and a location information module 115.

The broadcast reception module 111 receives broadcast signals and/or broadcast associated information from an external broadcast management server through a broadcast channel.

The mobile communication module 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet module 113 is configured to facilitate wireless Internet access. This module may be installed inside or outside the artificial intelligence device 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication module 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information module 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input interface 120 may include a camera 121 for receiving a video signal, a microphone 122 for receiving an audio signal, and a user input interface 123 for receiving information from a user.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input interface 123 receives information from a user. When information is received through the user input interface 123, the processor 180 may control operation of the artificial intelligence device 100 in correspondence with the input information.

The user input interface 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output interface 150 is typically configured to output various types of information, such as audio, video, tactile output, and the like. The output interface 150 may include a display 151, an audio output module 152, a haptic module 153, and a light output interface 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input interface 123 which provides an input interface between the artificial intelligence device 100 and the user.

The audio output module 152 is generally configured to output audio data received from the wireless communication interface 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output interface 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

An interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The power supply 190 receives external power or internal power and supplies the appropriate power required to operate respective components included in the artificial intelligence device 100, under control of the processor 180. The power supply 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 5:
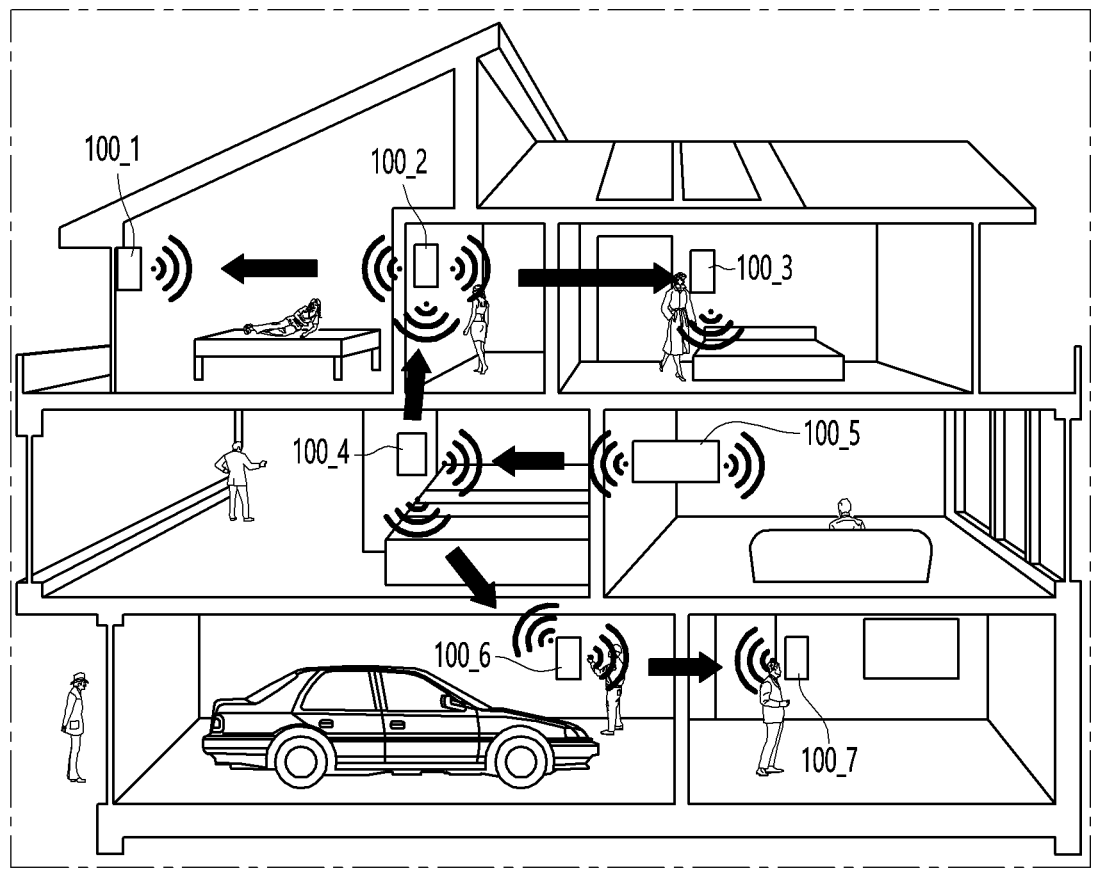
FIG. 5 is a view showing a smart home system according to an embodiment of the present disclosure.

FIG. 5 is a view showing a smart home system 10 according to an embodiment of the present disclosure.

The smart home system 10 may be an embodiment of the AI system 1.

The smart home system 10 is applicable to the inside and outside of various buildings, and is applicable to devices and sensors located inside and outside home, offices, transportation facilities, cultural facilities, sports facilities or various facilities in an integrated manner.

In addition, the smart home system 10 may provide convenience to a user by using a variety of data collected from a plurality of devices or sensors, allowing data to be shared between various devices or sensors and controlling the various devices or sensors.

In addition, the smart home system 10 may build a smart city. The smart city may mean a city for providing information necessary to efficiently manage assets and resources using a device (or a sensor) for collecting various types of electronic data.

Meanwhile, the smart home system 10 may include one or more home devices. The home devices 100_1, 100_2, 100_3, 100_4, 100_5, 100_6 and 100_7 may be an embodiment of an artificial intelligence device 100. The home devices may include fixed devices or mobile devices such as smart wall-pads, smart switches, TVs, door locking devices, remote controllers, cameras, home security cameras, lighting devices, temperature control devices, lighting control devices, air conditioners, wired/wireless video, audio or text data transceivers, air conditioning and heating devices, wired/wireless gateways, temperature/humidity/illuminance measuring devices, projectors, mobile phones, smartphones, desktops, laptops, digital broadcast terminals, personal digital assistants (PDAs), portable multimedia players (PMPs), navigation systems, tablet PCs, wearable apparatuses, set-top boxes (STBs), DMB receivers, radios, washing machines, refrigerators, desktop computers, digital signages, robots or vehicles.

Figure 6:
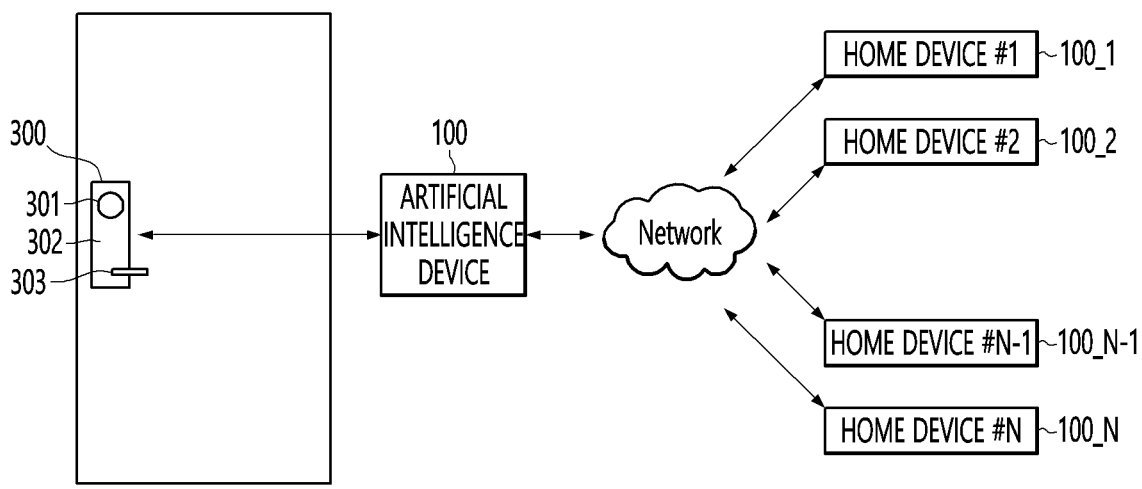
FIG. 6 is a view showing a smart home security system according to an embodiment of the present disclosure.

FIG. 6 is a view showing a smart home security system 20 according to an embodiment of the present disclosure.

The smart home security system 20 may be an embodiment of the smart home system 10.

The smart home security system 20 may be configured by connecting the artificial intelligence device 100, a door locking device 300 and a plurality of home devices 100_1, 100_2, 100_N-1 and 100_N over a wired/wireless network.

The door locking device 300 may be installed on the door of a building to control opening and closing of the door. In addition, the door locking device 300 may be a kind of home device.

In addition, the door locking device 300 may include a door camera 301 for photographing a visitor. The door camera 301 may be installed to photograph the surroundings of the door. The door camera 301 may be set to start photographing when an event in which a doorbell rings occurs or to always photograph the surroundings of the door.

In addition, the door locking device 300 may include a door speaker 302 capable of outputting an audio signal.

Meanwhile, the artificial intelligence device 100 may be a smart wall-pad. The smart wall-pad may be installed on the wall of a building to collect and display data from various types of devices and control the various types of devices.

Figure 7:
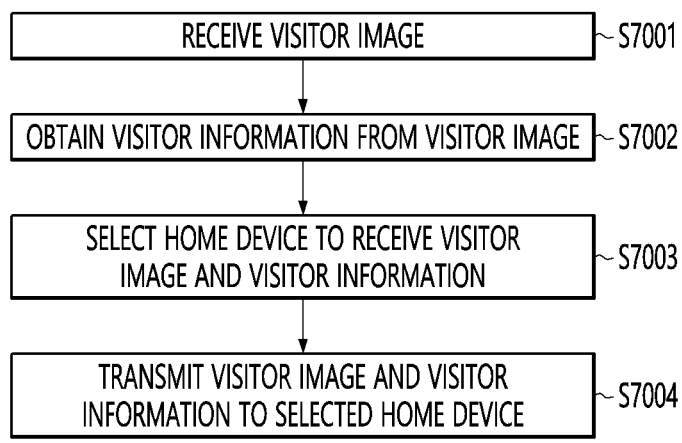
FIG. 7 is a flowchart illustrating a method of providing connection between devices for home security according to an embodiment of the present disclosure.

FIG. 7 is a flowchart illustrating a method of providing connection between devices for home security according to an embodiment of the present disclosure.

The communication interface 110 may receive a visitor image from the door locking device 300 including the door camera 301 for photographing the visitor (S7001).

The door locking device 300 may transmit the image of the surroundings of the door photographed by the door camera 301 to the artificial intelligence device 100.

For example, when the event in which the visitor rings the doorbell occurs, the door locking device 300 may allow the door camera 301 to start photographing of the visitor and transmit the photographed visitor image to the artificial intelligence device 100.

Meanwhile, the processor 180 may obtain visitor information output from a face recognition model by inputting the visitor image to the face recognition model (S7002).

The processor 180 may obtain the visitor information of a person included in the visitor image, by providing the visitor image to a visitor recognition model.

The visitor recognition model may compare the face of the visitor included in the input image with the faces of pre-registered visitors, specify who the visitor is, and output visitor information.

The visitor information may include at least one of visitor face information, visitor identity information, visit time information or visit count information.

For example, the visitor identity information may specify the identity of the visitor, and may specify information on a family member, a security guard and a deliverer. If the visitor is not identified, an unidentified visitor may be specified.

Meanwhile, the visitor recognition model may be an artificial neural network (ANN) model used in machine learning. The visitor recognition model is composed of artificial neurons (nodes) that form a network by synaptic connections. The image recognition model can be defined by a connection pattern between neurons in different layers, a learning process for updating model parameters, and an activation function for generating an output value.

The visitor recognition model may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

The visitor recognition model may be generated through supervised learning, unsupervised learning, and reinforcement learning according to the learning method.

For example, when the visitor recognition model is generated through supervised learning, this may be learned in a state in which a label for learning data is given. The label may mean the correct answer (or result value) that the artificial neural network must infer when the learning data is input to the artificial neural network.

The learning processor 130 may designate a label for specifying the face image of the visitor. For example, the face image of the family member, the face image of the security guard, the face image of the deliverer, and the unidentified face image may be labeled and designated.

Accordingly, the learning processor 130 may train the visitor recognition model to label the received face image upon registering the visitor information to identify visitors. Accordingly, when a new image file is input, the label of the face image included in the image file may be determined to identify the face of the visitor.

In addition, the visitor recognition model may be learned through unsupervised learning for training the artificial neural network in a state in which a label for learning data is not given or reinforcement learning in which an agent defined in a certain environment learns to select a behavior or a behavior sequence that maximizes cumulative compensation in each state.

Meanwhile, the processor 180 may select a home device to receive the visitor image and the visitor information, from a plurality of home devices (S7003).

When there are two or more home devices, the processor 180 may select a home device, to which the visitor image and the visitor information will be transmitted. Accordingly, the visitor image and the visitor information may not be transmitted to all the plurality of home devices included in the smart home security system 20, but may be transmitted to a specific home device, thereby preventing operations of the all devices from being interrupted.

In addition, the processor 180 may select the home device to receive the visitor image and the visitor information, from among the plurality of home devices, based on the operation state of each of the plurality of home devices.

For example, the processor 180 may determine a home device which is being used by a user based on whether each of the plurality of home devices operates, and select the home device which is being used by the user as the home device to receive the visitor image and the visitor information.

For example, when a parcel is delivered while a user watches a TV which is one of a plurality of home devices, the door locking device 300 may transmit a visitor image, that is, a captured deliverer image, to the artificial intelligence device 100. The processor 180 may obtain the visitor information output through the visitor recognition model. If the deliverer is previously registered, the visitor information may be obtained. The processor 180 may select the TV which is the home device used by the user from among the plurality of home devices, as the home device to receive the visitor image and the visitor information.

In addition, when a plurality of home devices is being used by a user, the processor 180 may select the home device to receive the visitor image and the visitor information based on the size of the display of each of the home devices which are being used by the user.

The processor 180 may determine a home device having a display having a predetermined size or more among the plurality of home devices and select the home device having the display having the predetermined size or more as the home device to receive the visitor image and the visitor information.

In addition, the processor 180 may select a home device having a display having a largest size from among the plurality of home devices, as the home device to receive the visitor image and the visitor information.

Meanwhile, the communication interface 110 may transmit the visitor image and the visitor information to the selected device (S7004).

The processor 180 may transmit the visitor image and the visitor information to the selected home service through the communication interface 110.

Accordingly, the selected home device may provide a home security interface for displaying the received visitor image and visitor information, such that the user checks the visitor.

FIG. 8 is a view showing a home security interface according to an embodiment of the present disclosure.

A home device 400 may receive a visitor image 406 and visitor information 407 from the artificial intelligence device 100. The visitor information 407 may include visitor count information. The home device 400 may include a TV.

The home device 400 may provide a home security interface 410 through a display. The home device 400 may receive an input door control command related to the door locking device 300 through the home security interface 410. The home device 400 may transmit the door control command related to the door locking device 300 to the artificial intelligence device 100.

The home security interface 410 may include control buttons 401, 402, 403 and 404 for controlling operation of the door locking device 300. In addition, the home security interface 410 may include a screen for displaying the visitor image 406 and the visitor information 407. In addition, the home security interface 410 may include a box button 405 for selecting a setting for allowing the door locking device 300 to perform the same operation with respect to the same visitor.

Meanwhile, the home device 400 may be controlled by a remote control device 500.

The remote control device 500 may include physical buttons 501, 502, 503 and 504 respectively corresponding to the control buttons 401, 402, 403 and 404 of the home security interface 410.

For example, the control buttons for controlling operation of the door locking device 300 may include a door open button 401 for unlocking, a call button 402 for call with a visitor, an automatic answering button 403 for outputting pre-stored voice and an ignoring button 404 for stopping doorbell sound and ending the home security interface 410 after a predetermined time. The first physical button 501 of the remote control device may correspond to the door open button 401, the second physical button 502 may correspond to the call button 402, the third physical button 503 may correspond to the automatic answering button 403, and the fourth physical button 504 may correspond to the ignoring button 404. The home device 400 may receive input for the control button corresponding to the physical button from the remote control device 500, and receive a control command for controlling the door locking device 300.

Meanwhile, the processor 180 may receive the control command for the door locking device 300 from the home device 400 which provides the home security interface 410 via the communication interface 110.

When an unlocking control command for the door locking device 300 is received from the home device 400, the processor 180 may control the door locking device 300 to unlock the door.

In addition, when a call mode control command for allowing the door locking device 300 to enter a call mode capable of making a call with a visitor is received from the home device 400, the processor 180 may activate a door speaker 302 and a door microphone 303 of the door locking device 300.

In addition, the processor 180 may control the door locking device 300 to output voice data received from the selected home device 400 through the door speaker 300 included in the door locking device 300.

In addition, when an automatic answering control command for allowing the door locking device 300 to output pre-stored voice data is received, the processor 180 may control the door locking device 300 to transmit the pre-stored voice data to the door locking device 300 and to output the pre-stored voice data through the door speaker 302.

Meanwhile, when the ignoring button 404 of the home security interface 410 is pressed, the processor 180 may control the door locking device 300 to stop the doorbell sound.

Meanwhile, when a setting for allowing the door locking device 300 to perform the same operation with respect to the same visitor is input through the home security interface 410, the processor 180 may match the received door control command with the visitor information and store it in the memory 170.

The processor 180 may input the visitor image input to the visitor recognition model, obtain the visitor information output from the visitor recognition model, determine whether there is a door control command matching the visitor information, and control the door locking device 300 using the door control command upon determining that there is a door control command matching the visitor information.

Meanwhile, when the face of the visitor is not identified from the visitor image and the visitor information cannot be obtained, the processor 180 may perform control such that the locking device enters a safe mode for a predetermined time.

The safe mode may refer to a mode in which a warning notification is output or transmitted to an external server upon determining that a visitor whose face is not identified stays for a predetermined time or a visitor revisits a predetermined number of times within a predetermined time.

The processor 180 may obtain a time when the visitor whose face is not identified stays based on the visitor image, after entering the safe mode.

In addition, the processor 180 may perform control to output an emergency notification through the door speaker, when the visitor whose face is not identified stays for the predetermined time or more.

In addition, the communication interface 110 may receive audio data obtained by the door microphone of the door locking device, and the processor 180 may perform control to output the emergency notification through the speaker when sound having a preset decibel or more is detected in the audio signal received after entering the safe mode.

Meanwhile, the processor 180 may obtain the visitor information output from the visitor recognition model and obtain visit history information. The visit history information may be information such as a time when a visitor visits or whether a visitor is registered as a permitted visitor.

The processor 180 may determine whether the visitor is previously registered based on the visitor information. When the visitor is not previously registered, the processor 180 may determine whether there is a history of a preset number of repeated visits for a preset time. Accordingly, the processor 180 may determine whether a visitor who is not allowed to visit has visited multiple times. Upon determining that an unregistered user has repeatedly visited by a predetermined number of times for a preset time, the processor 180 may perform control such that the door locking device enters the safe mode for a predetermined time.

Meanwhile, when a plurality of door locking devices is installed in a collective building facility such as an apartment, the artificial intelligence device 100 may receive and store the visitor information from each external door locking device and use the visitor information in a security service.

For example, the communication interface 110 may receive the face information of a visitor who has been refused to visit from a first external door locking device.

The memory 170 may store the face information of the visitor who has been refused to visit.

The processor 180 may determine whether the face information obtained from the visitor image received from the door locking device 300 matches the face information of the visitor which has been refused to visit. Accordingly, the processor 180 may determine whether the visitor has been refused to visit at another place.

When the face information obtained from the visitor image matches the face information of the visitor which has been refused to visit, the processor 180 may perform control the door locking device to enter the safe mode for a predetermined time.

In addition, the communication interface 110 may transmit, to a second external door locking device, the face information of the visitor who has been refused. Accordingly, the artificial intelligence device 100 may allow information on a dangerous person to be shared between devices.

Meanwhile, the processor 180 may determine whether the visitor is a permitted member based on the visitor information. The permitted member may include family members, friends, relatives and co-workers.

The artificial intelligence device 100 may obtain member information (e.g., family information), entry/exit history information, use information of each home device, sleep information of a member and home environment information, based on data received from the plurality of home devices.

For example, the artificial intelligence device 100 may obtain member information based on the number of portable devices connected to the home network and information on visitors photographed during entry/exit. The member information may be input by the user. Entry/exit of a person registered as a member may be permitted.

In addition, when the visitor is a permitted member, the processor 180 may update entry/exit history of the member. The processor 180 may store an entry/exit time of each member in the memory 170.

The processor 180 may obtain activity information of the member based on the updated entry/exit history and operation information of the plurality of home devices.

The activity information may mean a time/period/pattern of a member staying home and a usage time/period/pattern of each home device.

For example, the processor 180 may generate an entry/exit pattern on a monthly, day-of-week, time, weather or predetermined-period basis based on the entry/exit history of each member. Accordingly, the processor 180 may obtain the activity information of each member.

In addition, when each member stays in the house, the processor 180 may obtain the activity information of the member based on the types of the used home devices and a time.

For example, when a home device is a TV, the activity information of the member may be obtained based on the operation time information of the TV of the member.

The processor 180 may detect abnormal activity based on the activity information of the member.

The processor 180 may compare the previously obtained activity information of the member with the current activity information of the member and detect the abnormal activity when the previously obtained activity information of the member does not match the current activity information of the member.

For example, the processor 180 may detect that the abnormal activity has occurred, when a member who goes out once a week does not go out and does not use a TV even if the member does not go out.

The processor 180 may provide a notification to an external device when the abnormal activity is detected.

Figure 9:
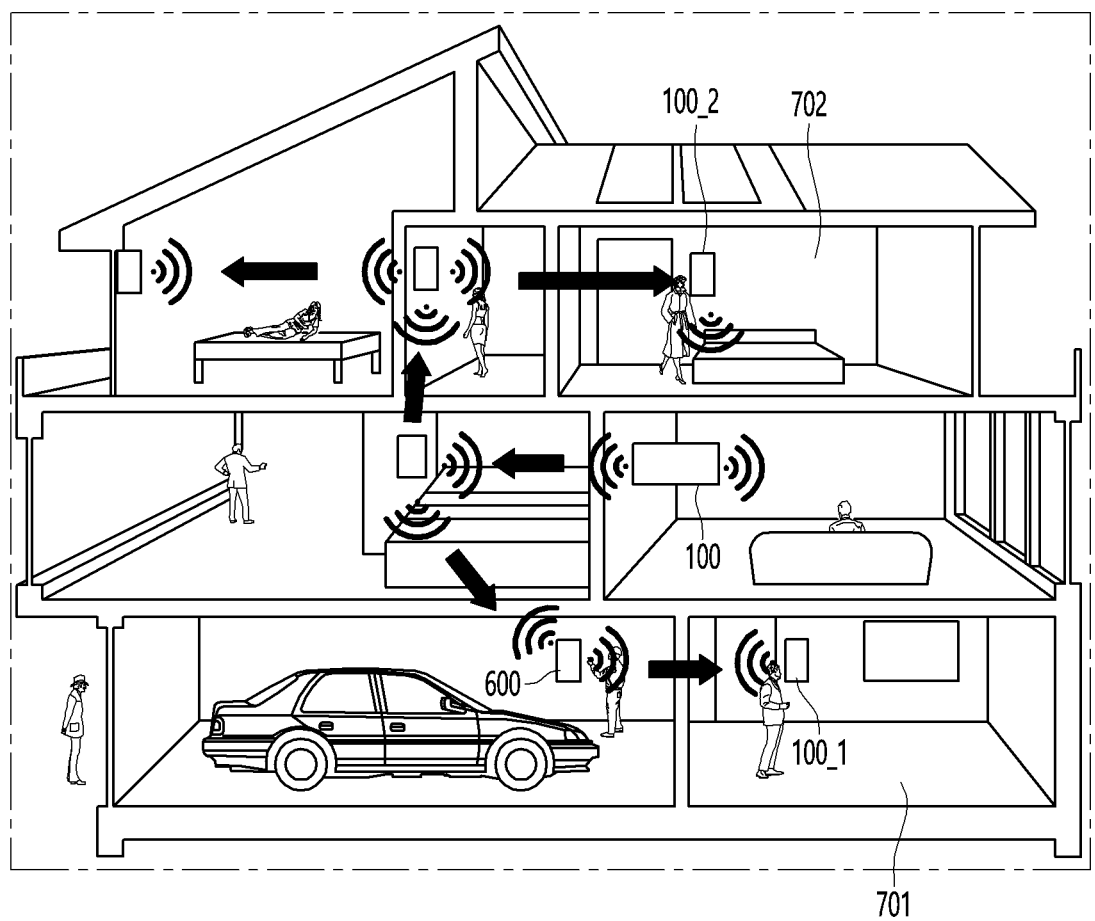
FIG. 9 is a view illustrating a method of providing connection between home devices according to an embodiment of the present disclosure.

FIG. 9 is a view illustrating a method of providing connection between home devices according to an embodiment of the present disclosure.

The plurality of home devices may be connected to the artificial intelligence device 100 via a wired/wireless network, configuring a home network system.

The artificial intelligence device 100 may be a gateway device connected to the plurality of home devices. Accordingly, the artificial intelligence device 100 may receive data from each of the plurality of home devices and transmit data to each of the different home devices.

The artificial intelligence device 100 may be requested to transmit data from a first home device 100_1 located in an underground space of a building to a second home device 100-2 located in a second-floor space 702.

The communication interface 110 may receive a request for connection from the first groove device 100_1 to the second groove device 100_2.

The processor 180 may obtain a first communication protocol used by the first groove device 100_1 and obtain a second communication protocol used by the second groove device 100_2.

For example, when the first groove device 100_1 uses a Bluetooth protocol and the second groove device 100_2 uses a Wi-fi protocol, data cannot be directly transmitted from the first groove device 100_1 to the second groove device 100_2. Accordingly, the processor 180 of the artificial intelligence device 100 may transmit data received from the first groove device 100_1 to the second groove device 100_2 using a Wi-fi communication protocol.

Accordingly, the artificial intelligence device 100 may provide connection between the plurality of home devices in the smart home system 10 including a plurality of devices which uses different communication protocols.

Accordingly, the artificial intelligence device 100 may perform a function for converting one protocol into another protocol among the plurality of home devices, each of which uses a single communication protocol.

Meanwhile, the artificial intelligence device 100 may display data collected from the plurality of home devices or display an integrated information interface 1000 capable of manipulating the plurality of home devices through the display 151.

FIG. 10 is a view showing an example of an integrated information interface according to an embodiment of the present disclosure.

The integrated information interface 1000 may include a temperature display interface 1001 for displaying temperature information and humidity information collected from a home device capable of measuring and adjusting a temperature and humidity.

In addition, the integrated information interface 1000 may include an indoor temperature display interface 1002 for displaying indoor temperature information and boiler operation status information collected from a home device capable of measuring and adjusting an indoor temperature and a home device having a boiler function.

In addition, the integrated information interface 1000 may include a visitor display interface 1003 for displaying a visitor image collected from a home device for photographing a visitor.

In addition, the integrated information interface 1000 may display operation mode interfaces 1004 and 1005 for displaying operation modes of indoor home devices. The operation mode interfaces 1004 and 1005 may include a homecoming mode interface 1004 for displaying a user entering the house and a wake-up mode interface 1005 for displaying a morning wake-up time.

In addition, the integrated information interface 1000 may include a lighting information interface 1006 capable of specifying a location of a home device having a lighting unit and controlling the home device having the lighting unit.

In addition, the integrated information interface 1000 may include a message information interface 1007 capable of displaying a message notification when a home device capable of receiving a message receives a message.

Meanwhile, the artificial intelligence device 100 may display a lighting control interface 1100 capable of controlling a plurality of home devices having a lighting unit through the display 151.

FIG. 11 is a view showing an example of a lighting control interface according to an embodiment of the present disclosure.

The lighting control interface 1100 may provide an interface for displaying an on/off state of a lighting device installed in each room and setting illuminance of all the light devices.

For example, the lighting control interface 1100 may include an interface 1101 for displaying current overall illuminance setting information in the form of a bar. In addition, when the user decreases or increases overall illuminance setting, the bar may be differently displayed (1102, 1103).

In addition, the lighting control interface 1100 may provide an interface 1104 capable of setting the illuminance of a lighting device installed in a specific room.

Meanwhile, the artificial intelligence device 100 may interwork with a home mail system 30.

Figure 12:
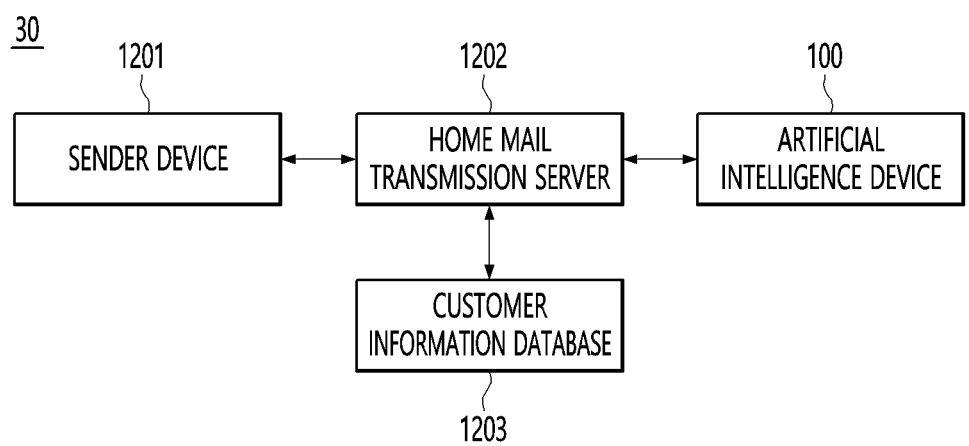
FIG. 12 is a block diagram of a home mail system according to an embodiment of the present disclosure.

FIG. 12 is a block diagram of a home mail system 30 according to an embodiment of the present disclosure.

The home mail system 30 may include a sender device 1201, a home mail transmission server 1202, a customer information database 1203 and the artificial intelligence device 100.

The home mail system 30 may be a system for replacing paper mail delivered to a house where the artificial intelligence device 100 is installed with electronic mail.

The mail transmission server 1202 may generate a unique identification mail address based on the address of a place where the artificial intelligence device 100 is installed. The unique identification mail address may be an e-mail address which may be distinguished for each address based on a plurality of offline addresses. Accordingly, the mail transmission server 1202 may assign distinct e-mail address to the address of the artificial intelligence device 100.

The customer information database 1203 may store information on the address of a place where the artificial intelligence device 100 is installed, a unique identification mail address corresponding to the address, and whether to consent to reception.

The sender device 1201 may be used by a sender who wants to send digital mail to the artificial intelligence device 100. For example, the sender may be a mobile communication provider, a stock company, an insurance company, an organization, etc. Meanwhile, the digital mail may replace existing paper mail. The existing paper mail may include various promotional materials in an apartment complex, maintenance fee statements, and notices in the apartment complex. In addition, the digital mail may be made in the form capable of receiving the votes from residents on various issues in the apartment complex and in the form capable of receiving whether to participate in a second-hand market. In addition, the digital mail may include promotional materials of shopping malls near the address where the artificial intelligence device 100 is installed, promotional materials of newly established stores or discount information. In addition, the digital mail may include information on an item delivered to the address where the artificial intelligence device 100 is installed, a delivery status and arrival information.

For example, the sender device 1201 may send digital mail replacing the paper mail to the artificial intelligence device 100 using a unique identification mail address corresponding to an offline address to receive paper mail through the mail transmission server 1202.

The mail transmission server 1202 may receive a request for transmission of the digital mail from the sender device 1201, obtain the unique identification mail address corresponding to the offline address of the place where the artificial intelligence device 100 is installed from the customer information database 1203, and send the digital mail to the artificial intelligence device 100 based on the unique identification mail address. Accordingly, the sender may send the digital mail using only the offline address of the place where the artificial intelligence device 100 is installed.

Accordingly, the sender can use digital content having better content delivery effect than the existing paper mail, thereby increasing customer satisfaction. In addition, it is possible to reduce cost waste by replacing the paper mail.

Meanwhile, the mail transmission server 1202 may receive feedback information on the digital mail sent by the sender device 1201 from the artificial intelligence device 100. The feedback information may a request for refusal to receive digital mail. When the request for refusal to receive the digital mail is received from the artificial intelligence device 100, the mail transmission server 1202 may update the customer information database 1203 and block the digital mail sent by the sender device 1201 in the future.

Figure 13:
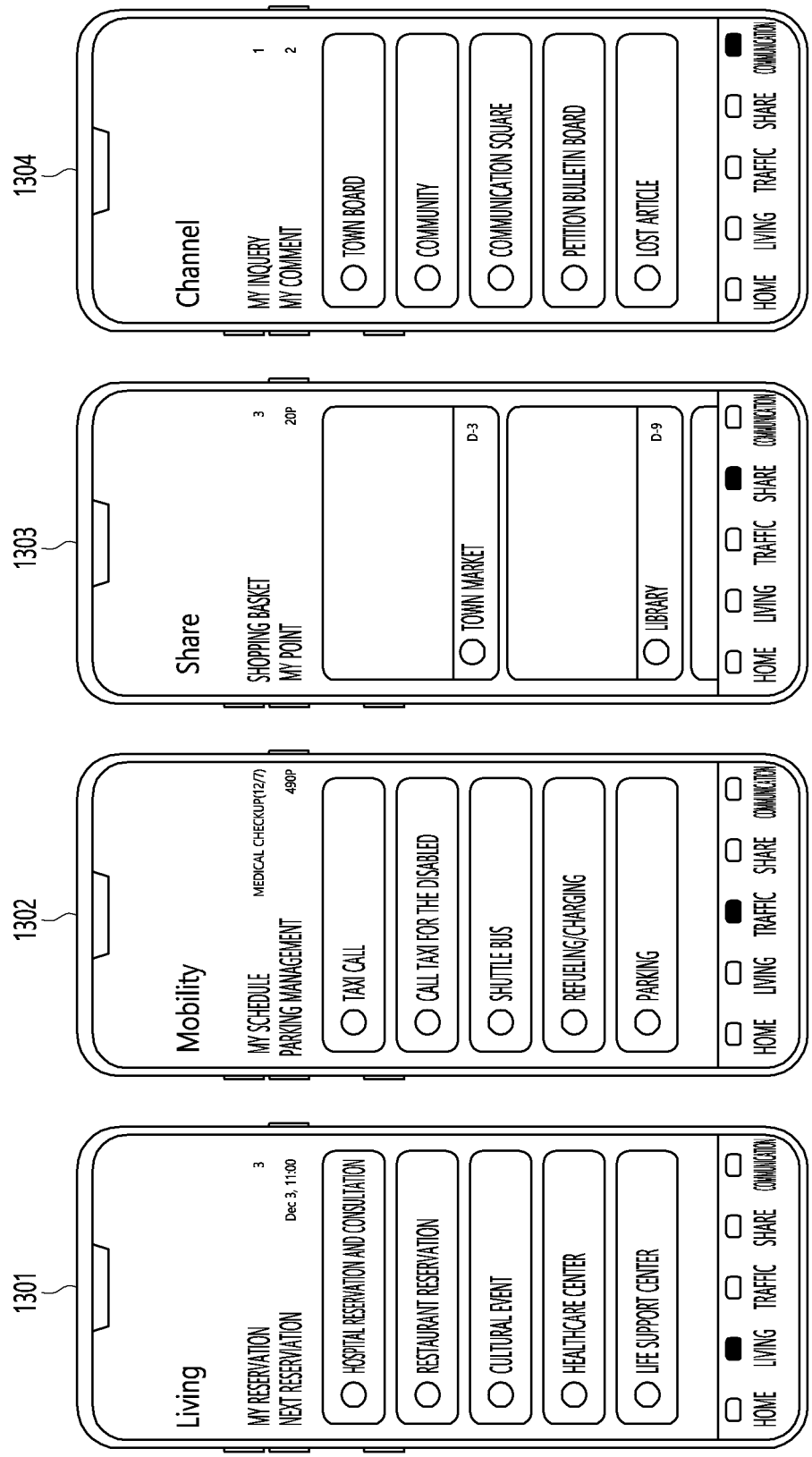
FIG. 13 is a view showing an example of an integrated convenience application according to an embodiment of the present disclosure.

FIG. 13 is a view showing an example of an integrated convenience application according to an embodiment of the present disclosure.

Meanwhile, the smart home system 10 may be connected to one or more user devices 1300. The user device 1300 may access various services provided within an area where the artificial intelligence device 100 is installed. For example, the user devices may include a smartphone and a vehicle.

The user device 1300 may execute an integrated convenience application. The integrated convenience application may provide a service capable of conveniently using culture, medical care, shopping facilities, etc. in the residential area of the user.

The user device 1300 may execute an integrated convenience application 1301 for providing information on neighboring hospitals or restaurants which may be reserved, providing information on surrounding cultural events and providing information on a healthcare center and a life support center.

In addition, the user device 1300 may execute an integrated convenience application 1302 for providing a service for easily reserving or calling various transportation means such as taxis, taxis for the disabled or vehicle sharing services, such that anyone including transportation vulnerable, such as the disabled and the elderly, can more conveniently move in the town. In addition, the integrated convenience application 1302 may recognize the user device 1300 to enable automatic parking settlement of the user device 1300.

In addition, the user device 1300 may execute an integrated convenience application 1303 for providing an online space where residents in a residential area can purchase baby products, toys, books, household goods, groceries, etc., transact used goods or share used goods without pay.

In addition, the user device 1300 may execute an integrated convenience application 1304 for providing an online communication space capable of supporting various meetings or activities of the residents in the residential area or conveniently sharing various types of inconveniences or suggestion/inquires, etc. occurring in commercial and/office spaces or neighboring facilities as well as the residential space in the town.

Meanwhile, when the user device 1300 is a vehicle, a vehicle payment system may be installed such that payment may be made even in the vehicle. For example, a beacon device of a store may detect the user device 1300 and provide a menu corresponding to the store, thereby enabling the user to pay for their order.

Meanwhile, when the user device 1300 is a vehicle, a vehicle security service may be provided. For example, when the vehicle is parked by someone other than the owner of the vehicle, a service capable of preventing vehicle theft and accidents may be provided. The user device 1300 may perform a valet parking mode. In the valet parking mode, the vehicle may be parked without the key of the vehicle. When the gear of the vehicle is shifted to the P mode, an interface capable of entering the valet parking mode may be displayed on the display. The vehicle may store an image of a driver who provides the valet parking service. In addition, the speed of the vehicle may be limited to a certain speed or less. In addition, a camera for photographing the inside of the vehicle and a microphone for recording sound may be activated. In addition, the photographed image may be transmitted to an external server to detect an abnormal behavior of the driver who performs valet parking. In addition, the vehicle may provide a notification to the owner of the vehicle after valet parking is completed. In addition, the valet parking mode of the vehicle may be set to be canceled at any time by the owner of the vehicle.

Meanwhile, the artificial intelligence device 100 may provide a service for guiding a way to a destination, by controlling the color of the lighting unit and on/off of the lighting unit of one or more home device having a lighting unit.

Figure 14:
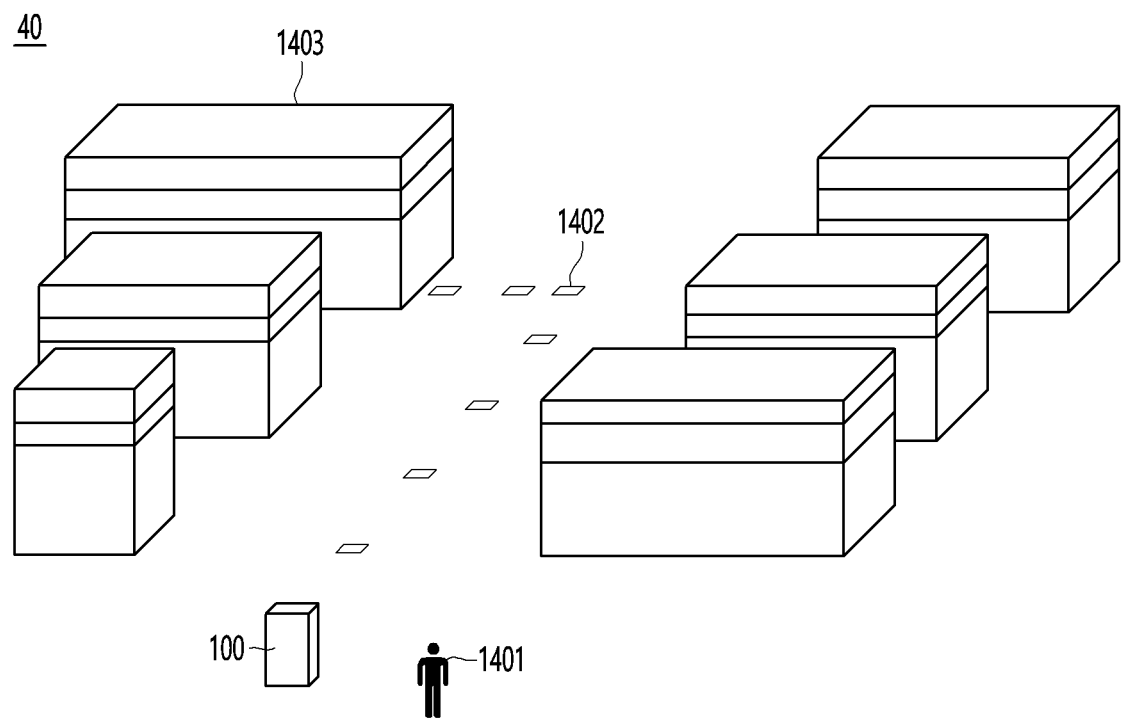
FIG. 14 is a view showing an example of a guidance system according to an embodiment of the present disclosure.
Figure 15:
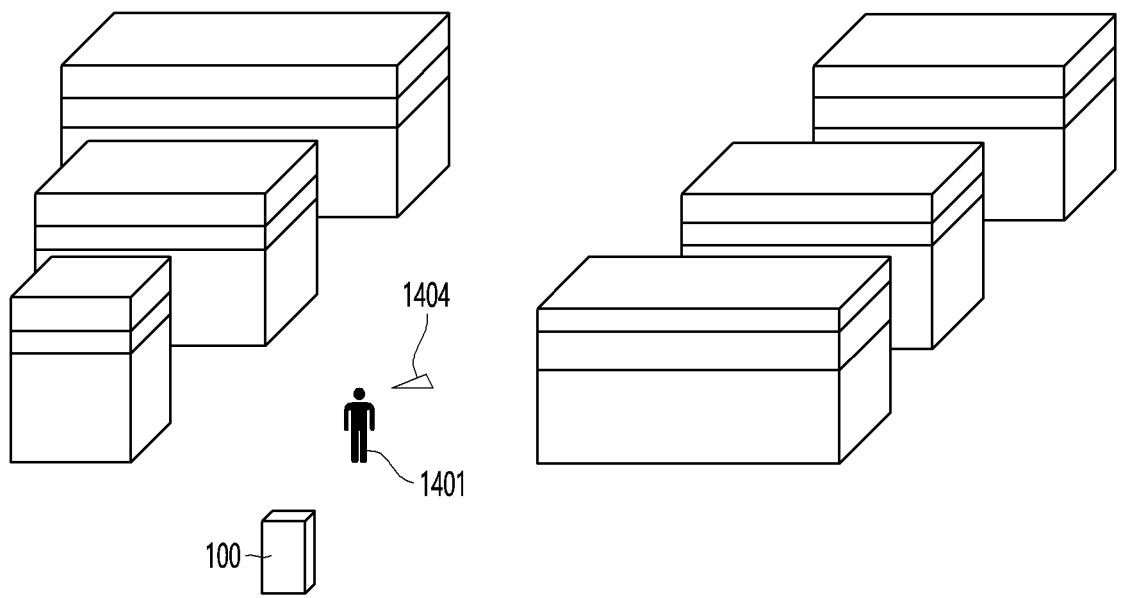
FIG. 15 is a view showing an example of a guidance system according to an embodiment of the present disclosure.

FIGS. 14 and 15 are views showing an example of a guidance system 40 according to an embodiment of the present disclosure.

A user 1401 may input a desired destination 1403 to the artificial intelligence device 100.

The artificial intelligence device 100 may photograph the user 1401 through a camera and recognize and store the face of the user 1401.

The artificial intelligence device 100 may obtain an image from a camera or a CCTV installed in a building and track an object matching the face of the user 1401 in the image, thereby continuously obtaining the position of the user 1401.

The artificial intelligence device 100 may guide the user 1401 to a route from the position of the user 1401 to a destination 1403, by controlling the color and on/off of the light devices 1402.

For example, the lighting devices 1402 installed on the way from the position of the user 1401 to the destination 1403 may be turned on. In addition, if a plurality of users 1401 inputs different destinations, the lighting devices 1402 may be controlled to display the ways of the users in different colors. The lighting device 1402 may include an LCD or LED panel. Meanwhile, the lighting device 1402 may generate sound, and may guide the user to the way when the user 1401 approaches.

In addition, the lighting devices 1402 on the road, along which the user 1401 has passed, may be turned off, and may be controlled such that the colors of the lighting devices are changed to other colors for the other users.

Meanwhile, the lighting device may include a beam projector installed on the ceiling of a building to emit light to the floor to guide the user to the way.

Referring to FIG. 15, the artificial intelligence device may control the beam projector such that a guide display 1404 is visible in front of the user based on the position of the user 1401.

Meanwhile, the artificial intelligence server 200 may be referred to as a regional service provision device 200. In addition, the artificial intelligence device 100 may be connected to the regional service provision device 200 via a wired/wireless network to receive regional service information from the regional service provision device 200.

Figure 16:
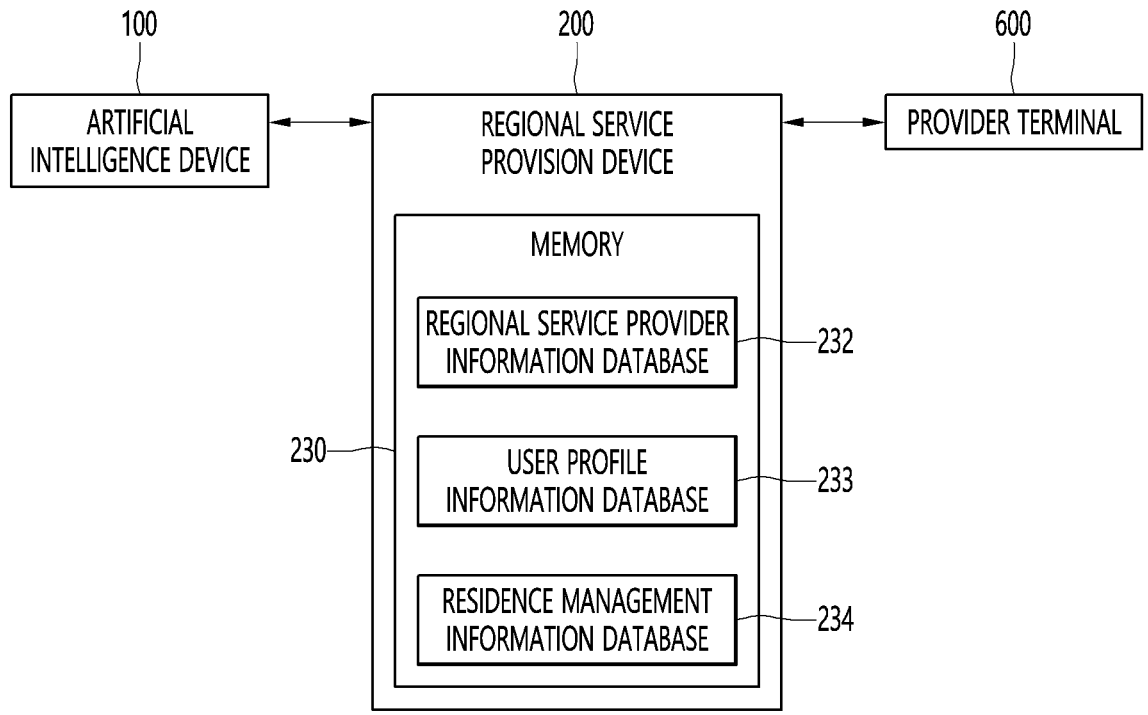
FIG. 16 is a view showing a regional service provision system according to an embodiment of the present disclosure.

FIG. 16 is a view showing a regional service provision system according to an embodiment of the present disclosure.

The regional service provision system 2 may include the artificial intelligence device 100, the regional service provision device 200 and a provider terminal 600.

The artificial intelligence device 100 may be installed in the user's residence. The artificial intelligence device 100 may receive a variety of regional information from the regional service provision device 200, display the variety of regional information through the display 151, and provide an interface for allowing the user to use various regional services.

Meanwhile, the memory 230 of the regional service provision device 200 may include a plurality of databases for storing a variety of regional information related to the user's residence.

For example, the memory 230 may include a regional service provider information database 232.

The regional service provider information database 232 may include provider information of a plurality of regional service providers. For example, the provider information may include at least one of provider name information, provider location information, category information, provider contact information, provider business hour information, provider homepage information, provider event information, or other provider information. The provider event information may include provider event progress information, event progress date information, provider popularity information, provider advertisement information and event tag information.

The provider popularity information may be calculated by an indices such as an evaluation score left by users who have visited regional service providers or have used services, the number of visits or the number of times of using the services.

In addition, the provider advertisement information may include information on whether a regional service provider executes an advertisement used to increase the exposure order in a search result and information on unit cost of advertisement.

Meanwhile, the memory 230 may include a user profile information database 233.

The user profile information database 233 may store a plurality of user profile information.

The user profile information may include a user ID, a name, a gender, an age, a residential address, family member information and subscription information.

The subscription information may include information on providers registered as a provider of interest by the user among a plurality of regional service providers. For example, the user may register a predetermined regional service provider as a provider of interest and receive new news or information on discount events.

Meanwhile, the regional service provision device 200 may include a residence management information database 234.

In addition, the residence management information may include electronic mail information sent to an electronic address associated with the user's residence. The electronic address associated with the user's residence may be an electronic mail address generated based on the actual address of the user's residence. The electronic mail information may include electronic mail information transmitted and received to and from the electronic mail address of the user. In addition, the residence management information may include residence news information of the user's residence. For example, when the user's residence is an apartment, the residence news information may include news of election of an apartment representative. In addition, the residence management information may include information on cost which has incurred in connection with the residence. The information on cost incurred in connection with the residence may include information on a billing company, details of costs, and a payment account. In addition, the residence management information may include a regional service provider information for providing a service related to the residence. The regional service provider for providing the service related to the residence may be referred to as a residence service provider. For example, the residence service provider may include a company that cleans a residence, a company that collects and washes laundry in the residence, etc. In addition, the residence management information may include residence advertisement information related to the residence. For example, the residence advertisement information may include job advertisement information for finding people related to the residence.

Meanwhile, the provider terminal 600 may be a terminal 600 used by a regional service provider for providing services related to the user's residence or providing services around the user's residence.

The regional service provider may include a provider for providing services corresponding to predetermined categories in an area around the user's residence. The service category may include categories such as shopping, restaurants, cafes, hospitals/pharmacies, educational facilities, and government offices.

Figure 17:
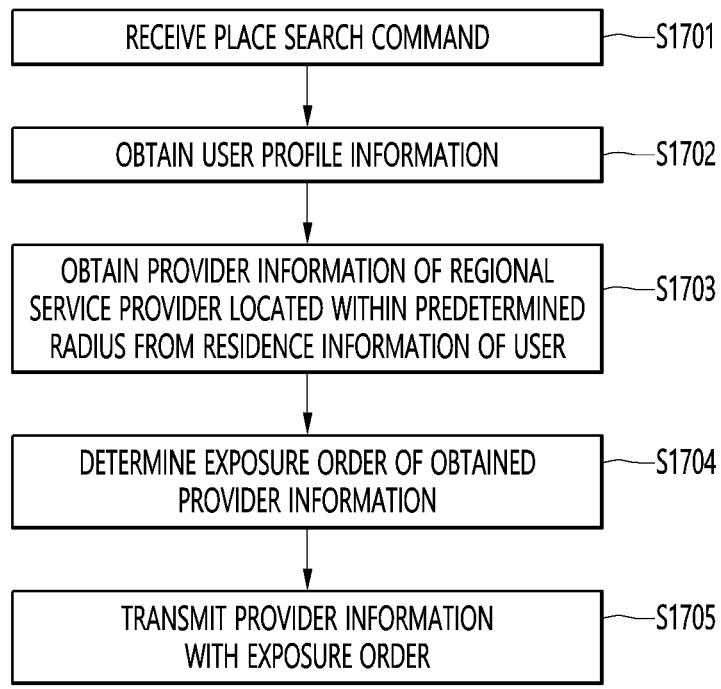
FIG. 17 is a flowchart illustrating a method of providing regional service information according to an embodiment of the present disclosure.

FIG. 17 is a flowchart illustrating a method of providing regional service information according to an embodiment of the present disclosure.

The regional service provision device 200 may receive a place search command from the artificial intelligence device 100 through the communication interface 210 (S1701).

The place search command may be a command for searching for a regional service provider located within a predetermined radius from the user's residence.

In addition, the place search command may be a command for searching for a regional service provider according to the service category. The service category may include categories such as shopping, restaurants, cafes, hospitals/pharmacies, educational facilities, and government offices.

The processor 260 of the regional service provision device 200 may obtain user profile information from the user profile information database 233 based on the identification information of the user who has input the place search command (S1702).

The identification information of the user may be an ID of the user who has logged in to the regional service provision device 200.

The processor 260 may obtain one or more provider information registered as a regional service provider within the predetermined radius based on the residence information included in the user profile information from the regional service provider database 232 (S1703).

The regional service provider may include a provider for providing services corresponding to predetermined categories in an area around the user's residence.

In addition, the processor 260 may set the exposure order of the provider information obtained based on regional service provider location information, subscription information, provider popularity information and provider advertisement information (S1704).

The processor 260 may set the exposure order of the provider information in the order close to the address of the user's residence based on the location information of the regional service provider.

In addition, the processor 260 may obtain subscription information included in the user profile information and determine the provider, to which the user has subscribed, among the regional service providers obtained based on the address of the user's residence. The processor 260 may set the exposure order of the information on the company, to which the user has subscribed, to be higher than that of the information on the company, to which the user has not subscribed, among the extracted provider information.

In addition, the processor 260 may set the exposure order of the extracted provider information based on the extracted regional service provider popularity.

The regional service provider popularity may be a score calculated using the number of subscribers, the number of user visits and the number of user orders.

The processor 260 may set the exposure order of the provider information of each of the plurality of regional service providers in the order of highest provider popularity, based on the provider popularity information of each of the plurality of regional service providers.

In addition, the processor 260 may determine the exposure order of the provider information based on the extracted advertisement information of the regional service company.

For example, the processor 260 may set provider information having highest advertisement cost among the provider information of the plurality of the regional service providers as a highest exposure order.

In addition, for example, the processor 260 may set the exposure order of the provider information based on advertisement cost, unit cost of advertisement, advertisement quality, advertisement click rate, etc. suggested by the regional service provider.

Meanwhile, the processor 260 may transmit provider information with the exposure order information to the artificial intelligence device 100 (S1706).

Figure 18:
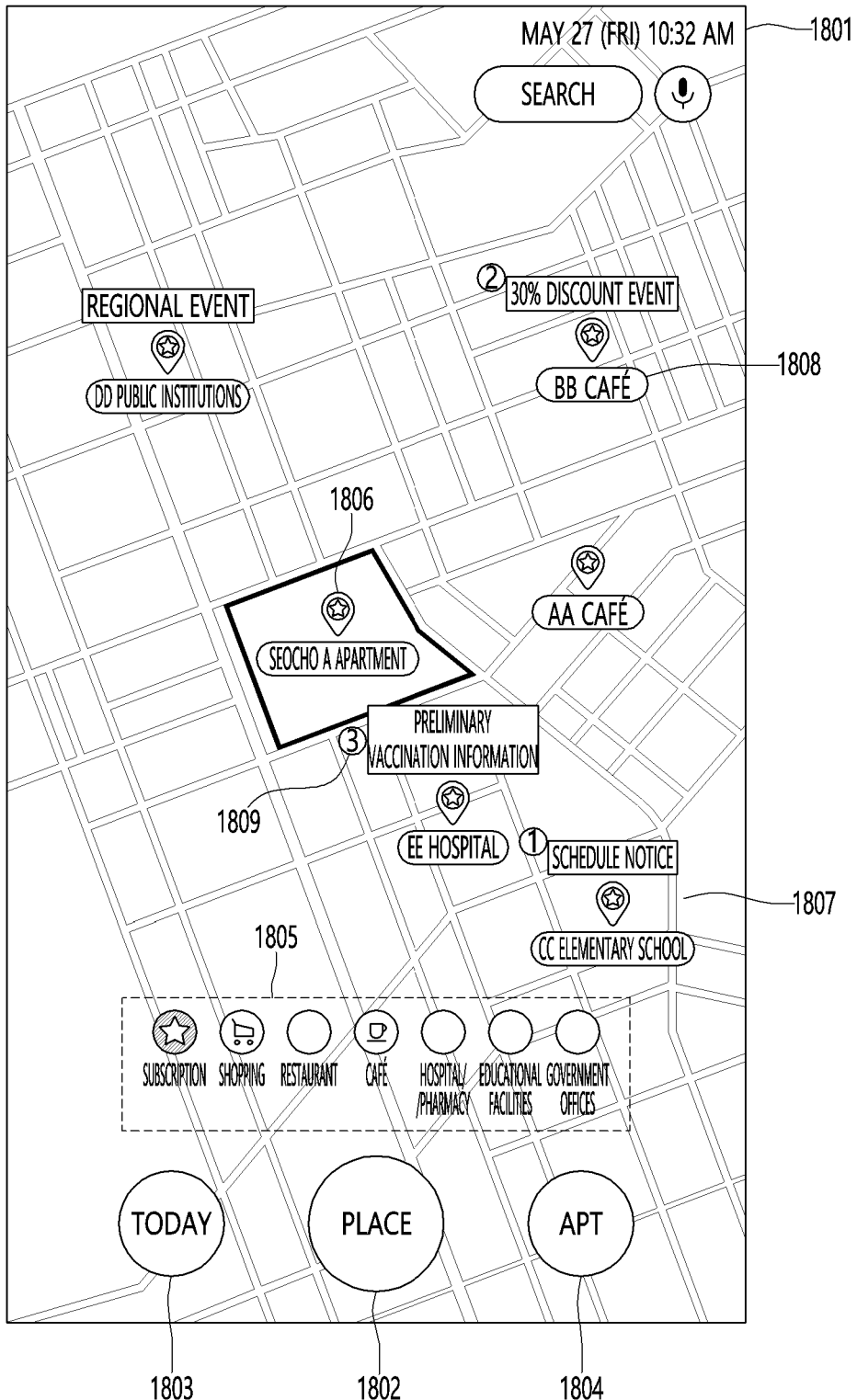
FIG. 18 is a view showing a screen for providing regional service information according to an embodiment of the present disclosure.

FIG. 18 is a view showing a screen for providing regional service information according to an embodiment of the present disclosure.

The artificial intelligence device 100 may output and provide a place search interface 1801. The place search interface 1801 may be a screen interface displayed through the display 151 of the artificial intelligence device 100.

In addition, the place search interface 1801 may be a screen interface called by the processor 180 when a place search button 1802 is selected by the user.

Meanwhile, the place search interface 1801 may include an event search button 1803 for switching an event search interface for displaying event schedule information of the regional service providers around the user's residence.

Meanwhile, the place search interface 1801 may include a management information search button 1804 for switching to a management information search interface for displaying management information related to the building in which the user resides (e.g., apartment).

Meanwhile, the place search interface 1801 may display service category information 1805. The service category information may be information on the categories of the plurality of regional service providers and may include "subscription" category, "shopping" category, "restaurant" category, "café" category, "hospital/pharmacy" category, "educational facility" category and "government office" category, depending on whether the user has registered it as the provider of interest".

Meanwhile, the place search interface 1801 may display the user's residence 1806 on a map image.

In addition, the place search interface 1801 may display a plurality of provider information with the exposure order information received from the regional service provision device 200.

For example, it is possible to display a provider name "CC elementary school", provider schedule information and provider subscription information of a searched first regional service provider 1807.

In addition, it is possible to display a provider name "BB cafe", provider event information and provider subscription information of a second regional service provider 1808.

In addition, the place search interface 1801 may display an exposure order of each regional service provider. For example, an exposure order icon 1809 may be displayed. The place search interface 1801 may attract a user's interest in a regional service provider with a higher exposure order, by displaying the exposure order icon 1809.

Figure 19:
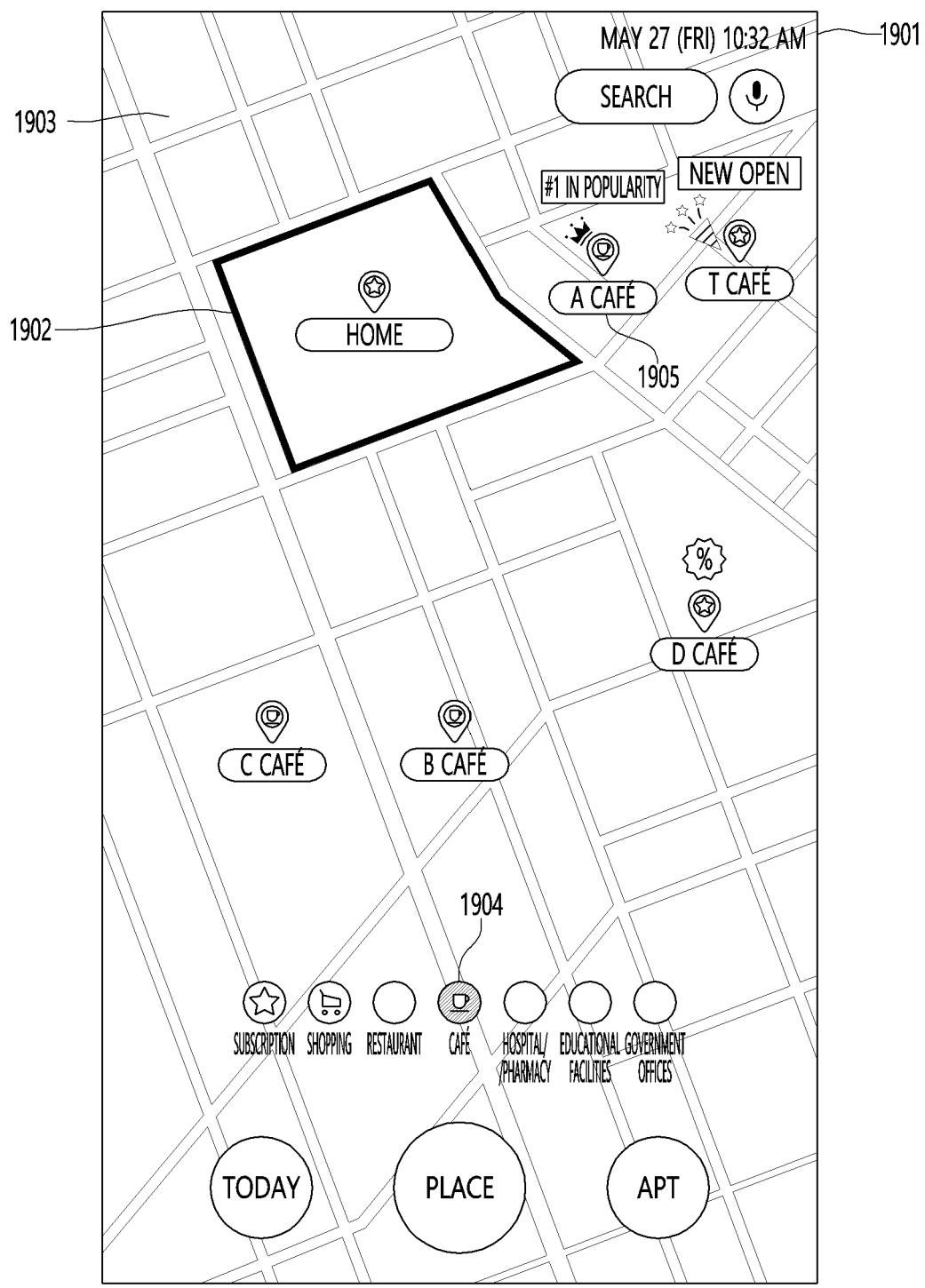
FIGS. 19 and 20 are views illustrating a method of registering regional service provider subscription information according to an embodiment of the present disclosure.
Figure 20:
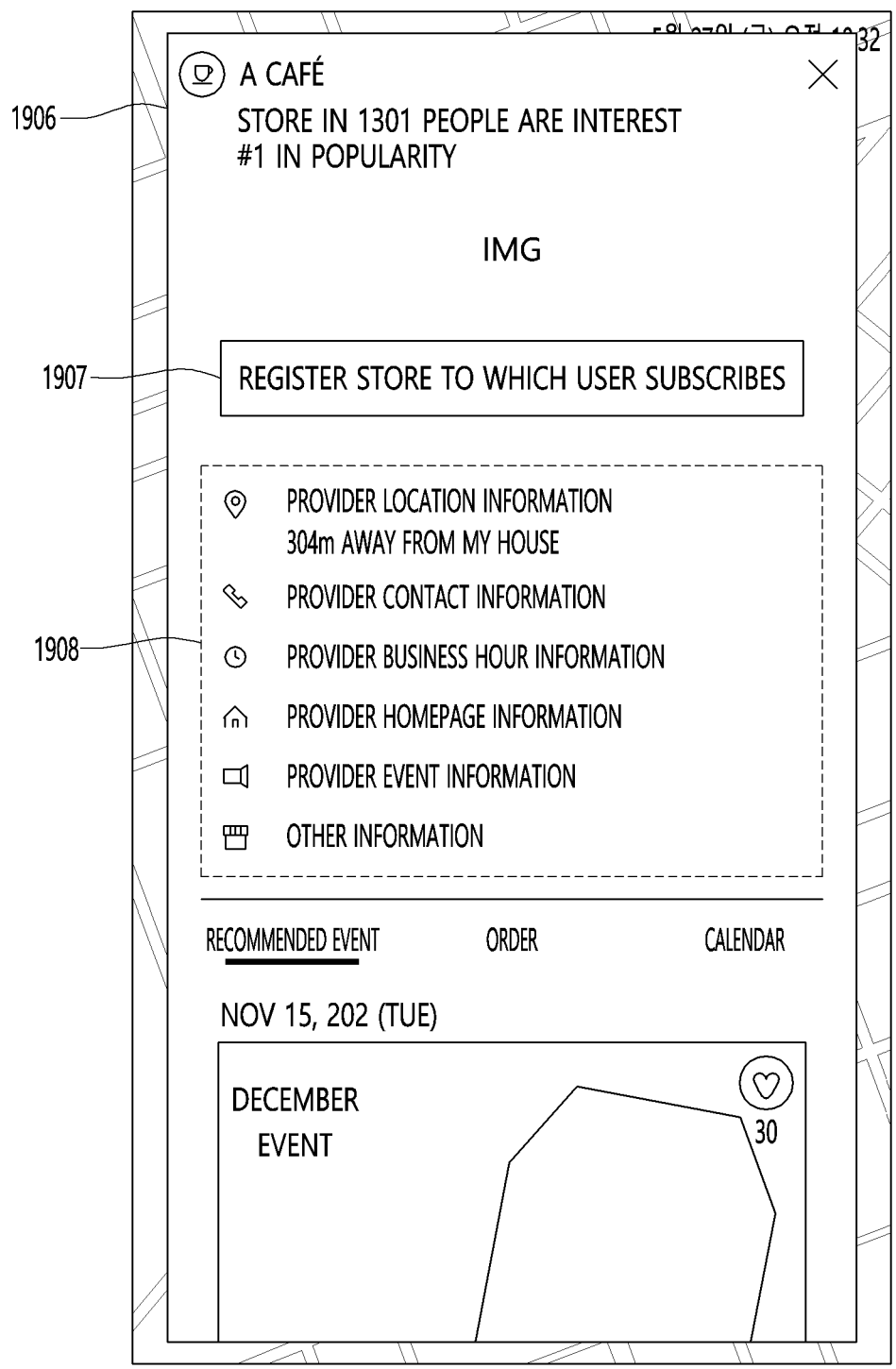

FIGS. 19 and 20 are views illustrating a method of registering regional service provider subscription information according to an embodiment of the present disclosure.

Referring to FIG. 19, the processor 180 of the artificial intelligence device 100 may display a place search interface 1901 through the display 151.

The place search interface 1901 may display a residential area 1902 based on the address of the user's residence. In addition, the place search interface 1901 may display a map image 1903 around the user's residence.

For example, the place search interface 1901 may include a category classification button 1904 for receiving a command for classifying a service category as "café". When the category classification button 1904 is input through the place search interface 1901, the processor 180 may obtain information on the regional service provider having the service category corresponding to the category classification button 1904 and display the information through the place search interface 1901.

Meanwhile, referring to FIG. 20, when one service provider 1905 is selected from among the plurality of regional service providers displayed on the place search interface 1901 through the input interface 120, the processor 280 may display a detailed information interface 1906 for displaying information on the selected provider through the output interface 150.

Meanwhile, the detailed information interface 1906 may include a detailed information display interface 1908 for displaying provider location information, provider contact information, provider business hour information, provider homepage information, provider event information and the other provider information of the provider information.

In addition, the detailed information interface 1906 may include a subscription button 1907 for allowing the user to subscribe to the selected regional service provider.

For example, the processor 180 may detect input of the subscription button 1907 through the input interface 120. The processor 180 may transmit information on the provider, which the user has subscribed, to the regional service provision device 200 through the communication interface 110. The regional service provision device 200 may receive the information on the provider, to which the user has subscribed, from the artificial intelligence device 100 and update the subscription information of the regional service provider, to which the user has subscribed, in connection with the user profile information.

Figure 21:
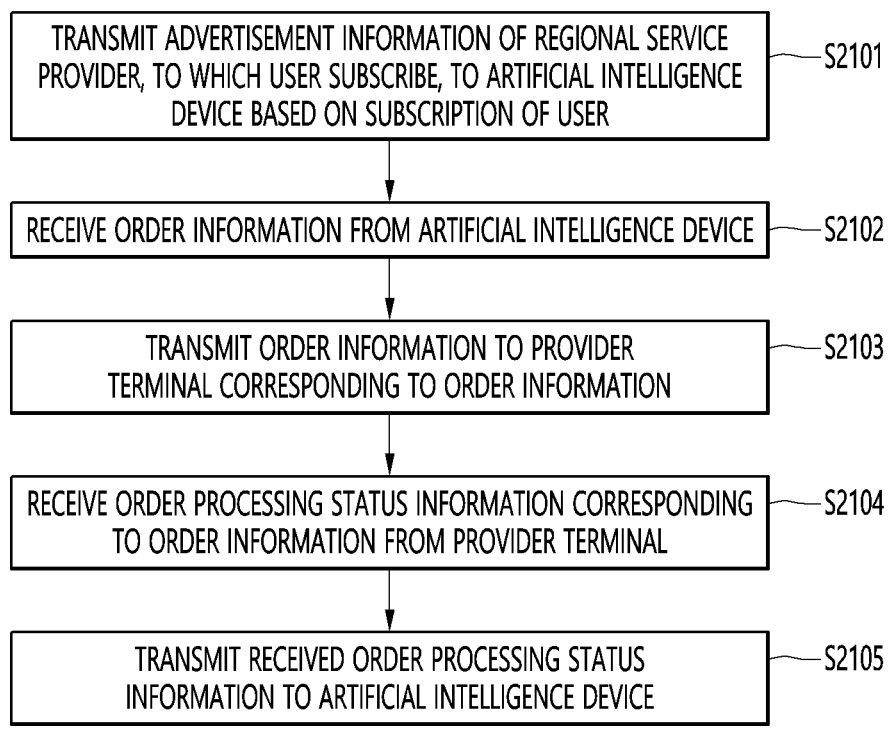
FIG. 21 is a view illustrating a method of mediating purchase of goods sold by a regional service provider according to an embodiment of the present disclosure.

FIG. 21 is a view illustrating a method of mediating purchase of goods sold by a regional service provider according to an embodiment of the present disclosure.

The processor 260 of the regional service provision device 200 may determine the regional service provider, to which the user has subscribed, among the plurality of regional service providers. For example, the processor 260 may obtain the provider information of each of the plurality of regional service providers located within the predetermined radius based on the residence address included in the profile information of the user from the regional service provider information database 232, and determine whether it is the regional service provider, to which the user has subscribed, based on the subscription information included in each provider information.

In addition, the processor 260 may transmit the advertisement information of the regional service provider, to which the user has subscribed, among the plurality of regional service providers to the artificial intelligence device 100 based on whether the user has subscribed (S2101). The advertisement information may include information such as product or service information provided by the regional service provider, price, rating, accumulated purchase amount, etc.

Figure 22:
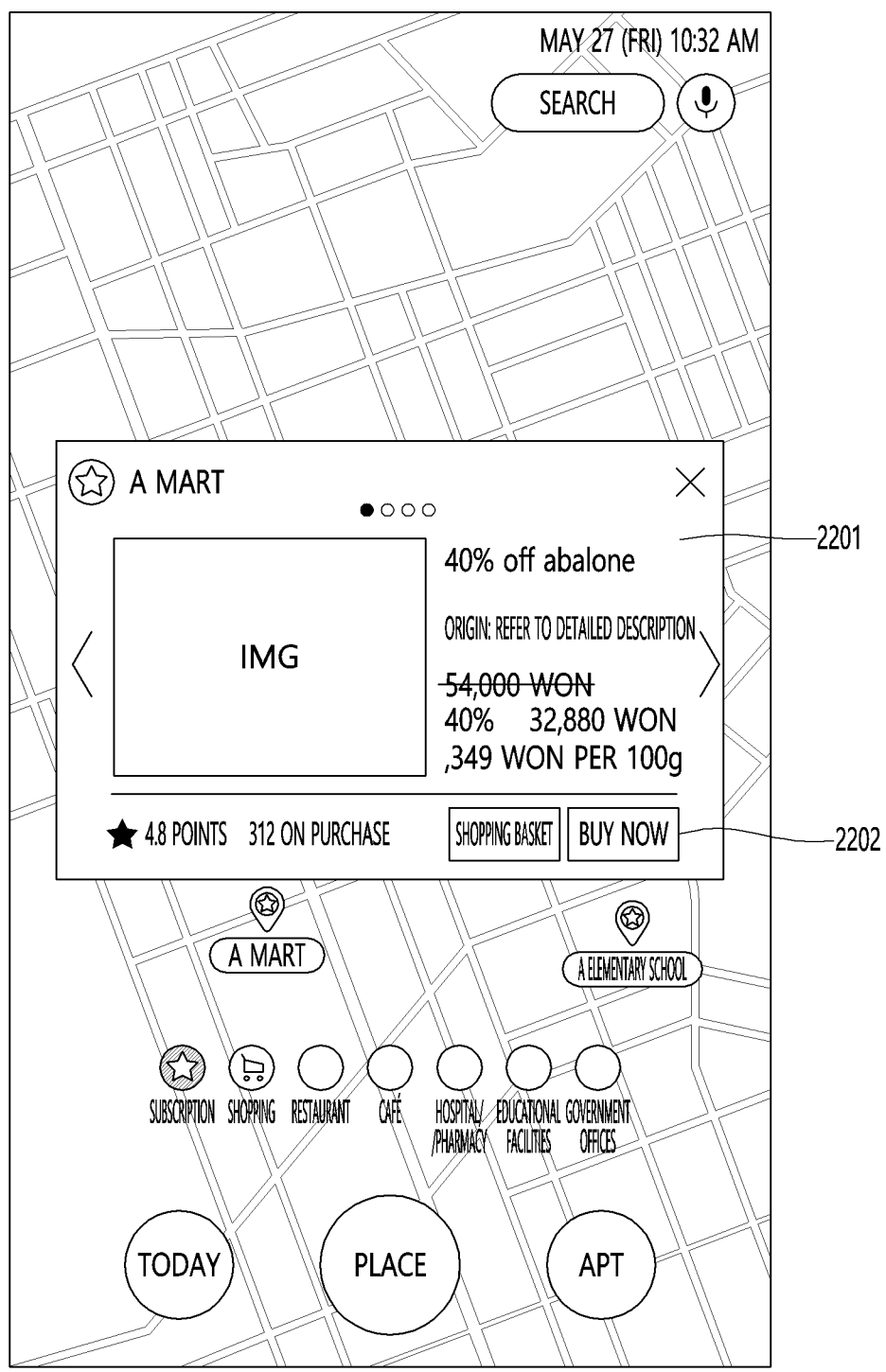
FIG. 22 is a view showing a screen for displaying advertisement information of a reginal service provider according to an embodiment of the present disclosure.

FIG. 22 is a view showing a screen for displaying advertisement information of a reginal service provider according to an embodiment of the present disclosure.

Referring to FIG. 22, the artificial intelligence device 100 may display an advertisement interface 2201 including advertisement information received from the regional service provision device 200 through the display 151. The advertisement interface 2201 may be displayed on the place search interface in a popup form.

Meanwhile, the advertisement interface 2201 may include a purchase button 2202 for enabling the user to purchase an advertised product included in the advertisement information.

Meanwhile, the artificial intelligence device 100 may detect that the user has clicked the purchase button 2202 through the input interface 120. The artificial intelligence device 100 may transmit order information to the regional service provision device 200.

Accordingly, the regional service provision device 200 may receive the order information associated with the advertisement information from the artificial intelligence device 100 through the communication interface 210 (S2102).

Meanwhile, the regional service provision device 200 may transmit the order information to the provider terminal 600 corresponding to the received order information through the communication interface 210 (S2103).

In addition, the provider terminal 600 may process the order information received from the regional service provision device 200. Meanwhile, the provider terminal 600 may transmit order processing status information which is information on order information processing status to the regional service provision device 200. In addition, the regional service provision device 200 may receive order processing status information corresponding to the order information from the provider terminal 600 (S2104).

The order processing status information may include information on an order processing step and real-time delivery status information. For example, the order processing step may be divided into order completion, delivery preparation, delivery departure, delivery completion. In addition, the real-time delivery status information may include information on a delivery route and the location of a deliverer.

In addition, the regional service provision device 200 may transmit the order processing status information corresponding to the order information to the artificial intelligence device 100 (S2105).

The artificial intelligence device 100 may display the order processing status information received from the regional service provision device 200 through the display 151.

Figure 23:
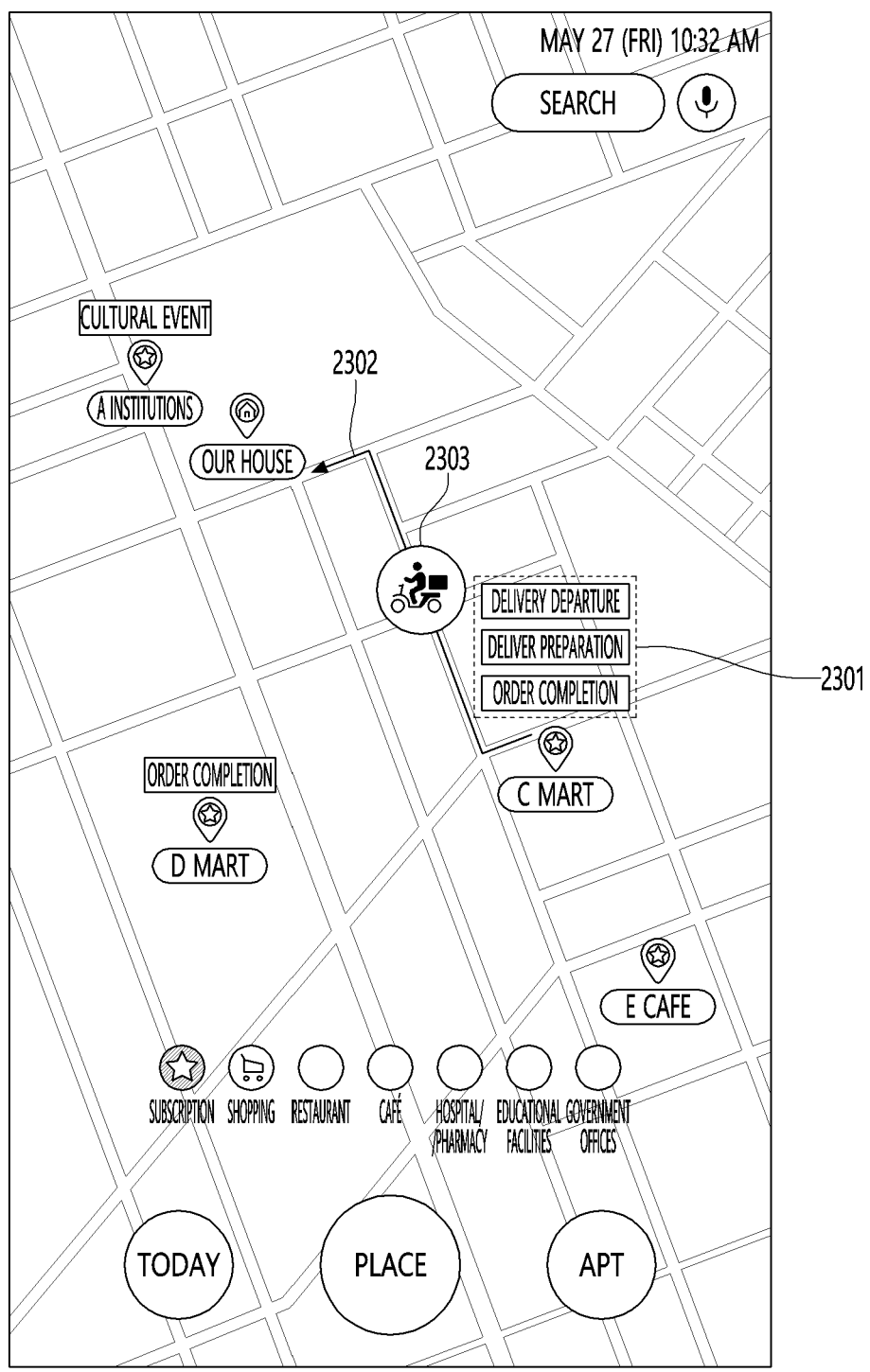
FIG. 23 is a view illustrating a screen for displaying order processing status information according to an embodiment of the present disclosure.

FIG. 23 is a view illustrating a screen for displaying order processing status information according to an embodiment of the present disclosure.

Referring to FIG. 23, the artificial intelligence device 100 may display order processing step information 2301 included in the received order processing status information on the place search interface. In addition, the artificial intelligence device 100 may display real-time delivery status information included in the received order processing status information to the place search interface. For example, the place search interface may display a delivery route 2302 and a location 2303 of a deliverer.

Accordingly, the user may search for regional service providers around the residence using the artificial intelligence device 100, and purchase sold products, such that the products may be delivered.

Figure 24:
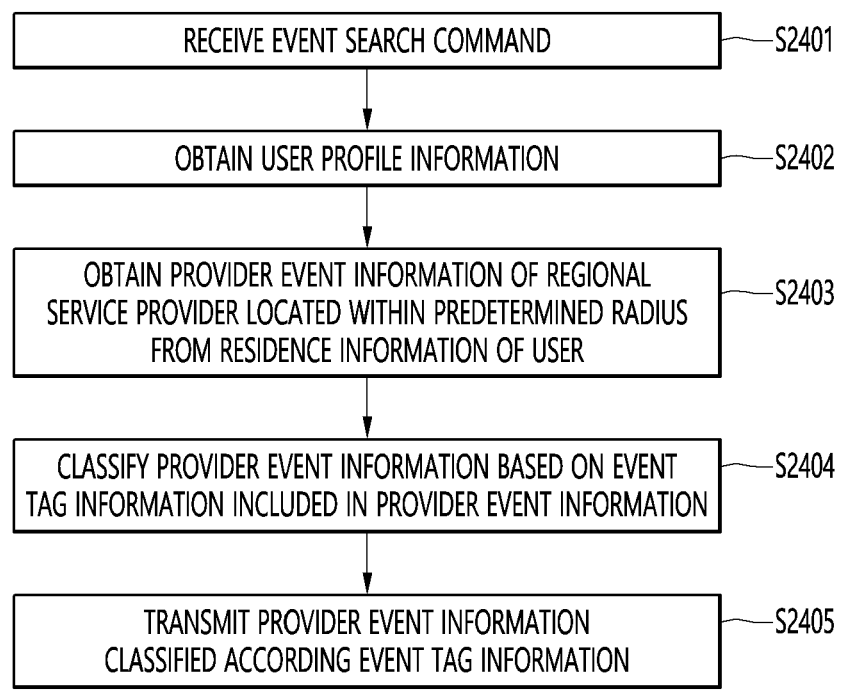
FIG. 24 is a flowchart illustrating a method of providing regional event information according to an embodiment of the present disclosure.

FIG. 24 is a flowchart illustrating a method of providing regional event information according to an embodiment of the present disclosure.

The regional service provision device 200 may receive an event search command from the artificial intelligence device 100 through the communication interface 210 (S2401).

The event search command may be a user's command for searching for event information conducted by a regional service provider around the residence using a predetermined search word.

Meanwhile, the processor 260 may obtain the user profile information associated with the user who has input the event search command from the user profile information database 233 (S2402).

The processor 260 may obtain the provider event information of the regional service provider located within the predetermined radius based on the residence information of the user included in the user profile information from the regional service provider information database 232 (S2403).

Meanwhile, the processor 260 may classify the provider event information for each event tag information based on event tag information included in the provider event information (S2404).

The event tag information may be expressed within a predetermined number of characters by summarizing the provider event information.

In addition, the processor 260 may determine the frequency of frequent occurrence for each event tag information (S2405). For example, when first event tag information is a "discount event" and the number of provider event information including the event tag "discount event" is 5, the processor 260 may determine that the frequency of frequent occurrence of the first event tag information is 5.

The processor 260 may transmit a plurality of event tag information, a frequency of frequent occurrence of the plurality of event tag information and provider event information classified as each of the plurality of event tag information to the artificial intelligence device 100 through the communication interface 210.

Figure 25:
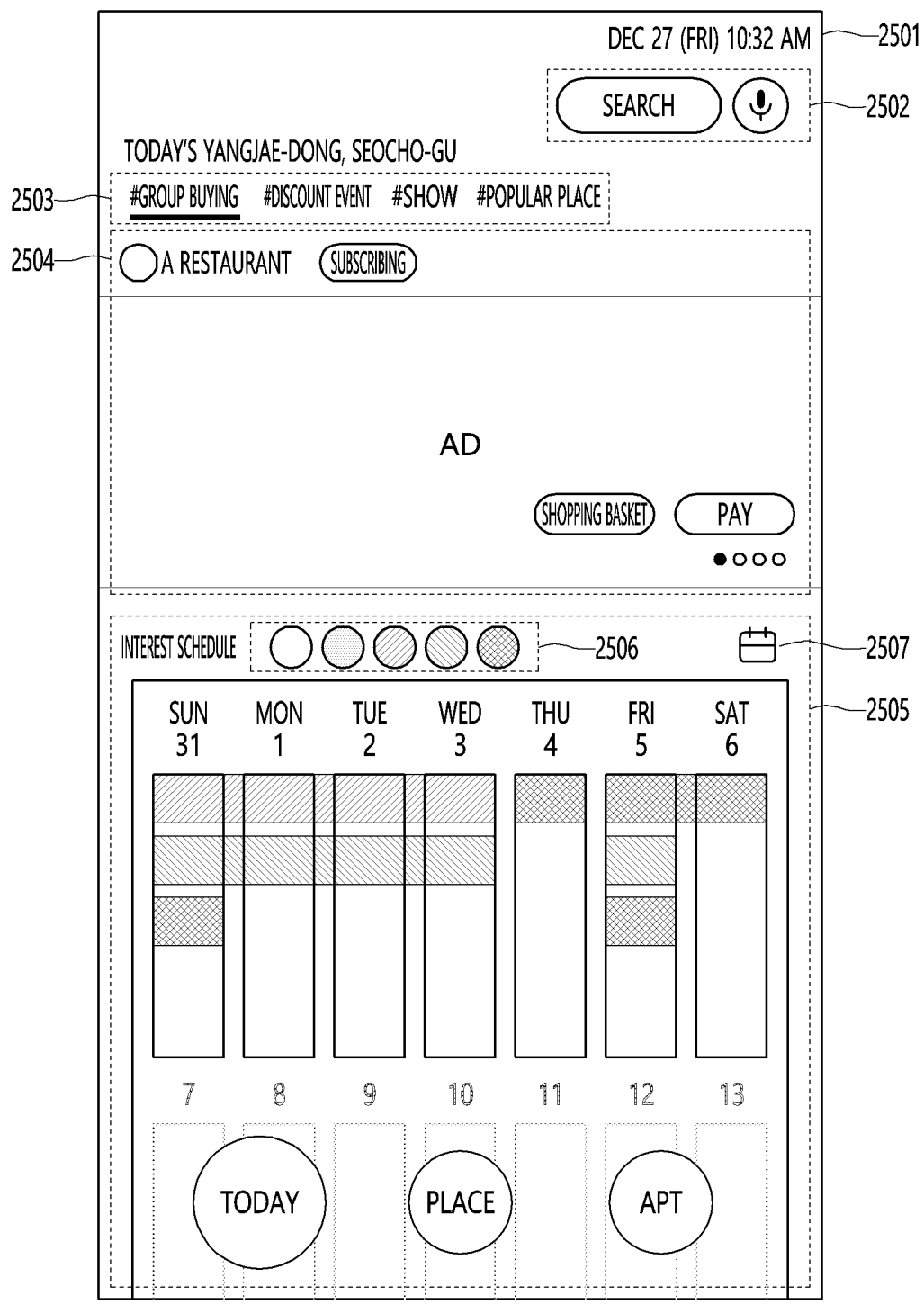
FIGS. 25 and 26 are views showing an event search interface according to an embodiment of the present disclosure.
Figure 26:
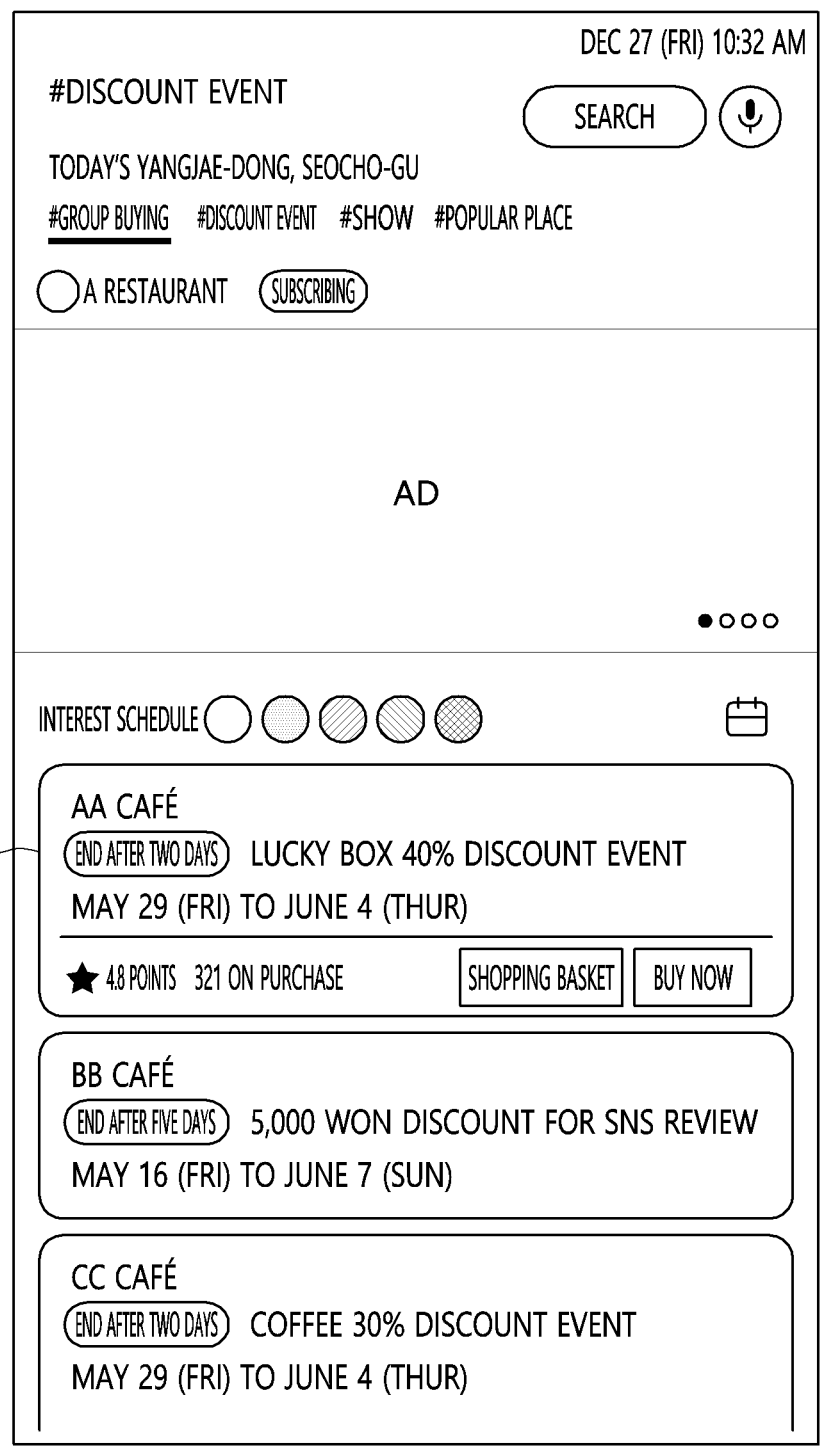

FIGS. 25 and 26 are views showing an event search interface according to an embodiment of the present disclosure.

Referring to FIG. 25, the processor 180 of the artificial intelligence device 100 may display an event search interface 2501 through the display 151.

The processor 180 may receive provider event information of the plurality of regional service providers from the regional service provision device 200 through the communication interface 110. In addition, the processor 180 may receive a plurality of event tag information, the frequency of frequent occurrence of each of the plurality of event tag information and the provider event information classified as the plurality of event tag information through the communication interface 110. The provider event information may include provider event progress information, event progress date information, provider popularity information, provider advertisement information and provider event tag information.

The processor 180 may display the provider event information of the plurality of regional service providers received from the regional service provision device 200 through an event search interface 2501.

The event search interface 2501 may include an event search word input interface 2502. The processor 180 may transmit a search word input through the event search word input interface 2502 to the regional service provision device 200, and receive provider event information associated with the search word from the regional service provision device 200.

In addition, the event search interface 2501 may include an event tag information interface 2503. The processor 180 may display an event tag information interface 2503 for displaying each of the plurality of event tag information received from the regional service provision device 200. The event tag information interface 2503 may display the event tag information aligned in the order of frequency of frequent occurrence.

In addition, the event search interface 2501 may include an advertisement information interface 2504. The processor 180 may display provider advertisement information through the advertisement information interface 2504, based on the provider advertisement information included in the provider event information received from the regional service provision device 200.

In addition, the event search interface 2501 may include an interest schedule information interface 2505.

The interest schedule information interface 2505 may display the provider event information of each of the plurality of regional service providers, to which the user has subscribed, for each provider or schedule.

For example, the interest schedule information interface 2505 may display each of the plurality of regional service providers, to which the user has subscribed, using an icon 2506 having different colors.

In addition, the interest schedule information interface 2505 may display the event schedule of each of the plurality of regional service providers in different colors in the form of a calendar.

In addition, the interest schedule information interface 2505 may display a detailed view icon 2507 for displaying the event information of each of the plurality of regional service providers in detail. The processor 180 may detect that the detailed view icon 2507 is selected through the input interface 120 and display the event information of the regional service provider in the form of a list.

Referring to FIG. 26, the event search interface 2501 may display an event detail information interface 2508 for displaying an event schedule and event content included in the event information of the regional service provider in the form of a list.

Figure 27:
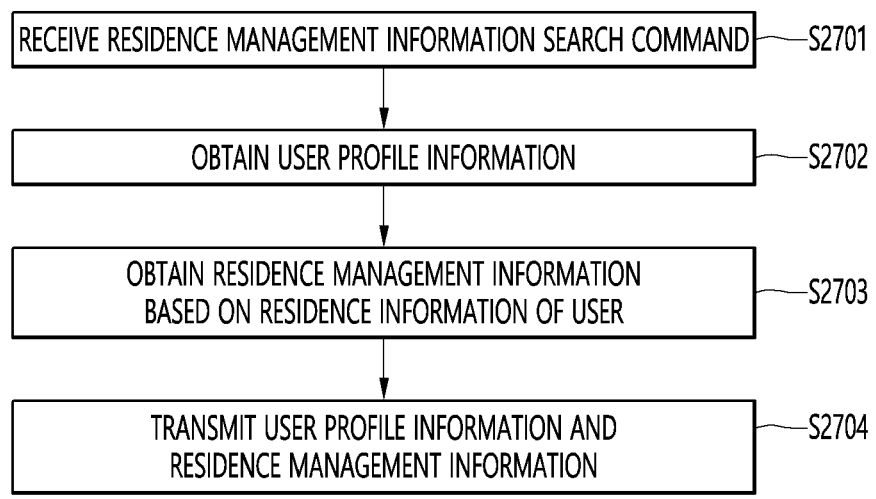
FIG. 27 is a flowchart illustrating a method of providing residence management information according to an embodiment of the present disclosure.

FIG. 27 is a flowchart illustrating a method of providing residence management information according to an embodiment of the present disclosure.

The communication interface 210 of the regional service provision device 200 may receive a residence management information search command from the artificial intelligence device 100 (S2701).

Meanwhile, the processor 260 may obtain user profile information associated with the user who has input the residence management information search command from the user profile information database 233 (S2702).

The processor 260 may obtain residence management information associated with the user's residence from the residence management information database 233 based on the residence information of the user included in the user profile information (S2703).

Meanwhile, the residence management information may include electronic mail information, residence news information, cost information, residence service provider information and residence advertisement information.

The processor 260 may transmit the user profile information and the residence management information to the artificial intelligence device 100 through the communication interface 210 (S2704).

Figure 28:
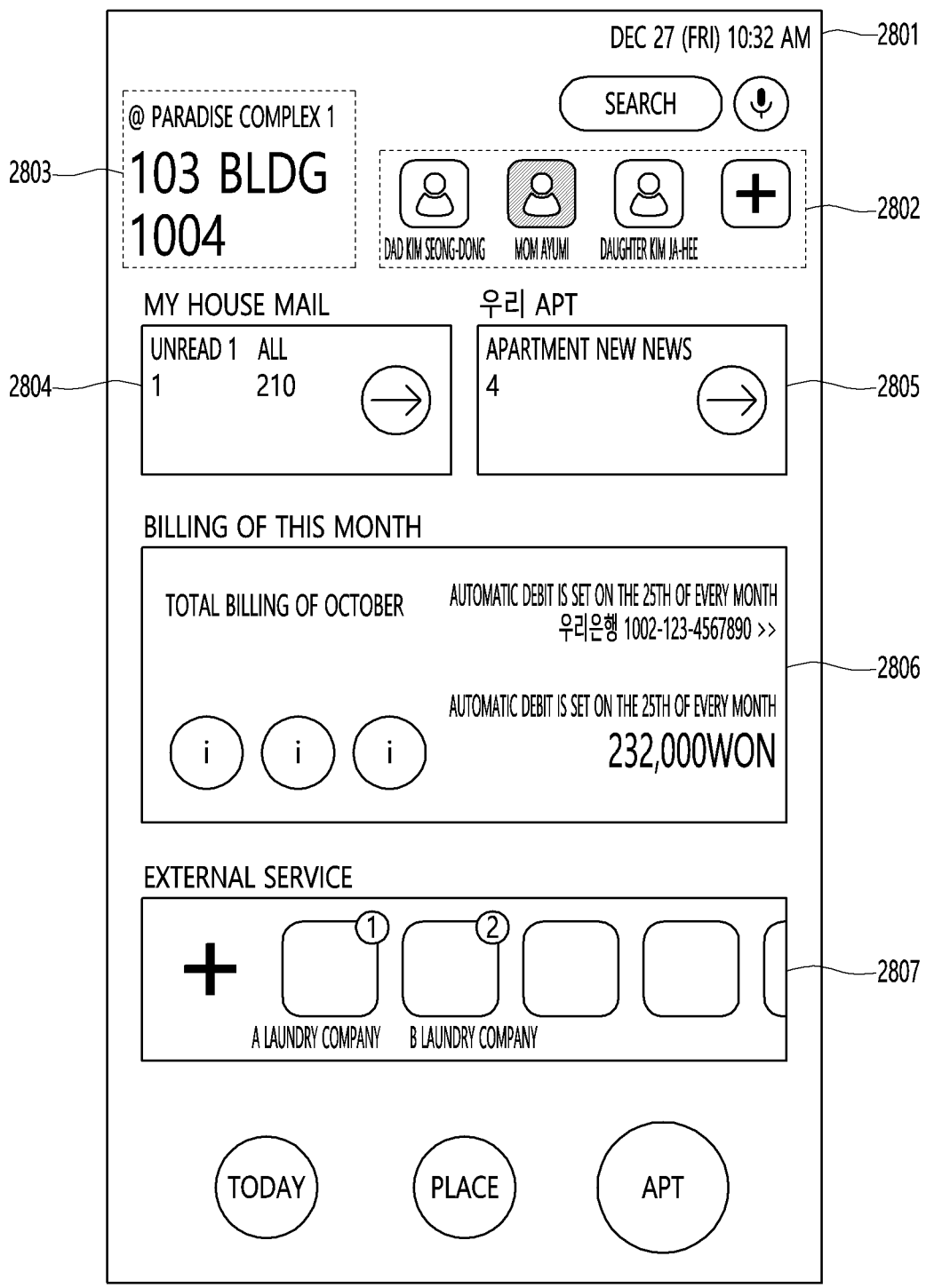
FIG. 28 is a view illustrating a management information search interface according to an embodiment of the present disclosure.

FIG. 28 is a view illustrating a management information search interface according to an embodiment of the present disclosure.

Referring to FIG. 28, the processor 180 of the artificial intelligence device 100 may display a management search interface 2801 through the display 151.

The processor 180 may receive the user profile information and the residence management information from the regional service provision device 200 through the communication interface 110.

The processor 180 may display the user profile information and the residence management information received from the regional service provision device 200 through the residence management information search interface 2801.

The residence management information search interface 2801 may include a member information interface 2802 for displaying family member information included in the user profile information.

The residence management information search interface 2801 may include a residence information interface 2803 for displaying residence information included in the user profile information.

The residence management information search interface 2801 may include an electronic mail information interface 2804 for displaying electronic mail information included in the residence management information.

Figure 29:
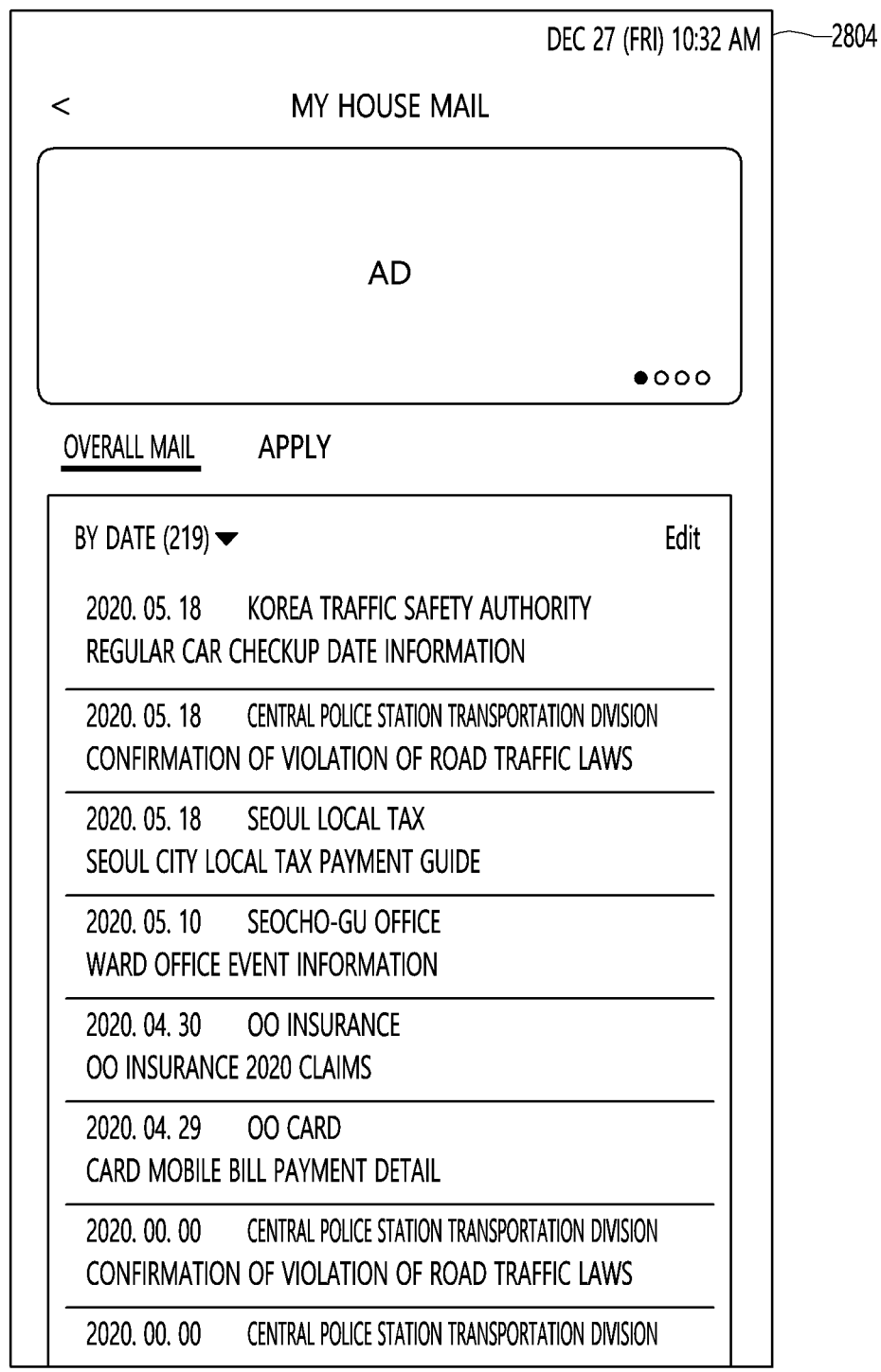
FIGS. 29 and 30 are views illustrating an electronic mail information interface according to an embodiment of the present disclosure.

Referring to FIG. 29, the electronic mail information interface 2804 may provide an interface for enabling the user to check and manage a plurality of electronic mail information transmitted from the plurality of provider terminals 600 to the electronic mail address of the user.

Figure 30:
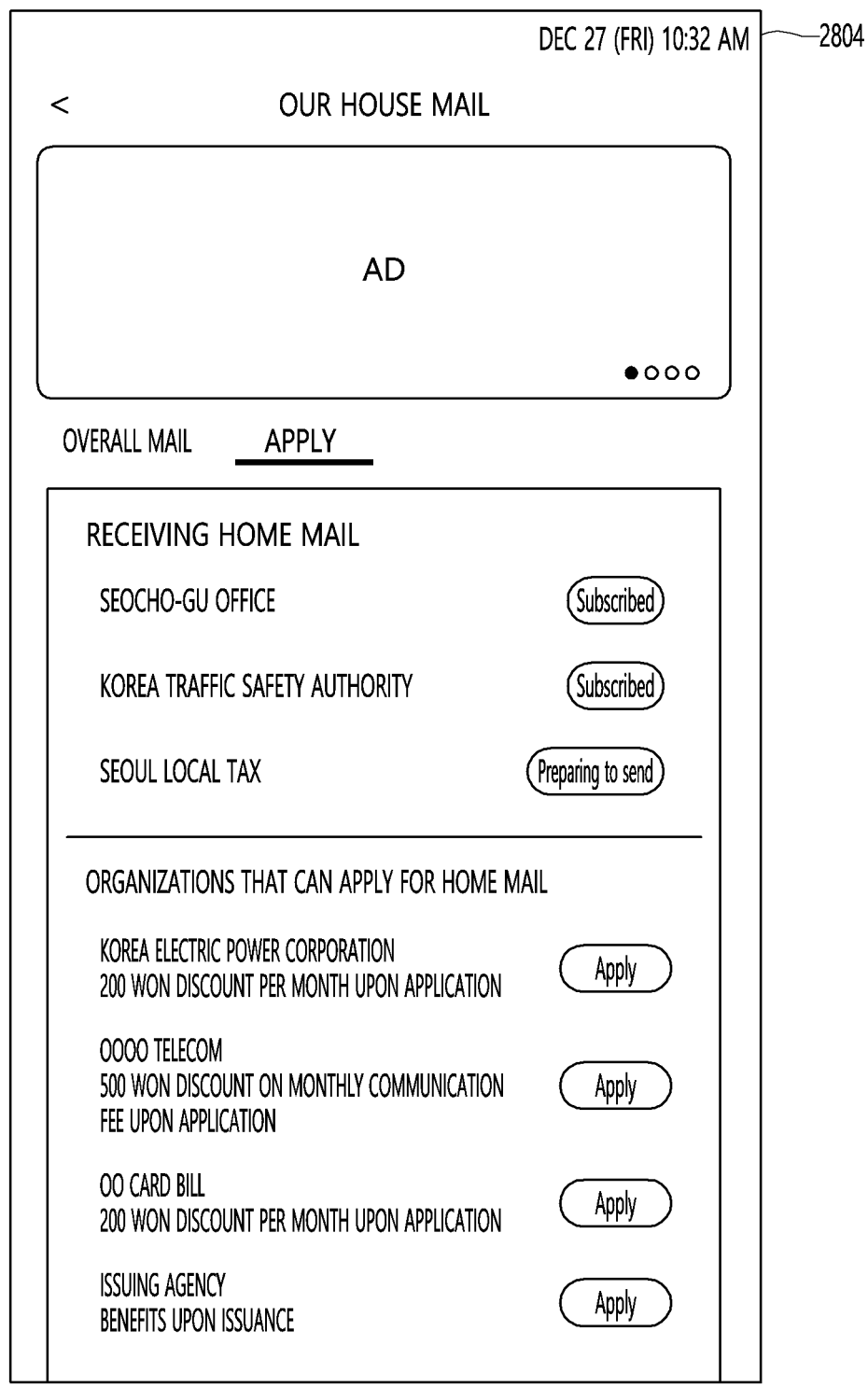

In addition, referring to FIG. 30, the electronic mail information interface 2804 may provide an interface for applying for a provider, from which the user wants to receive an electronic mail.

In addition, the residence management information search interface 2801 may include a residence news interface 2805 for displaying residence news information included in the residence management information.

Figure 31:
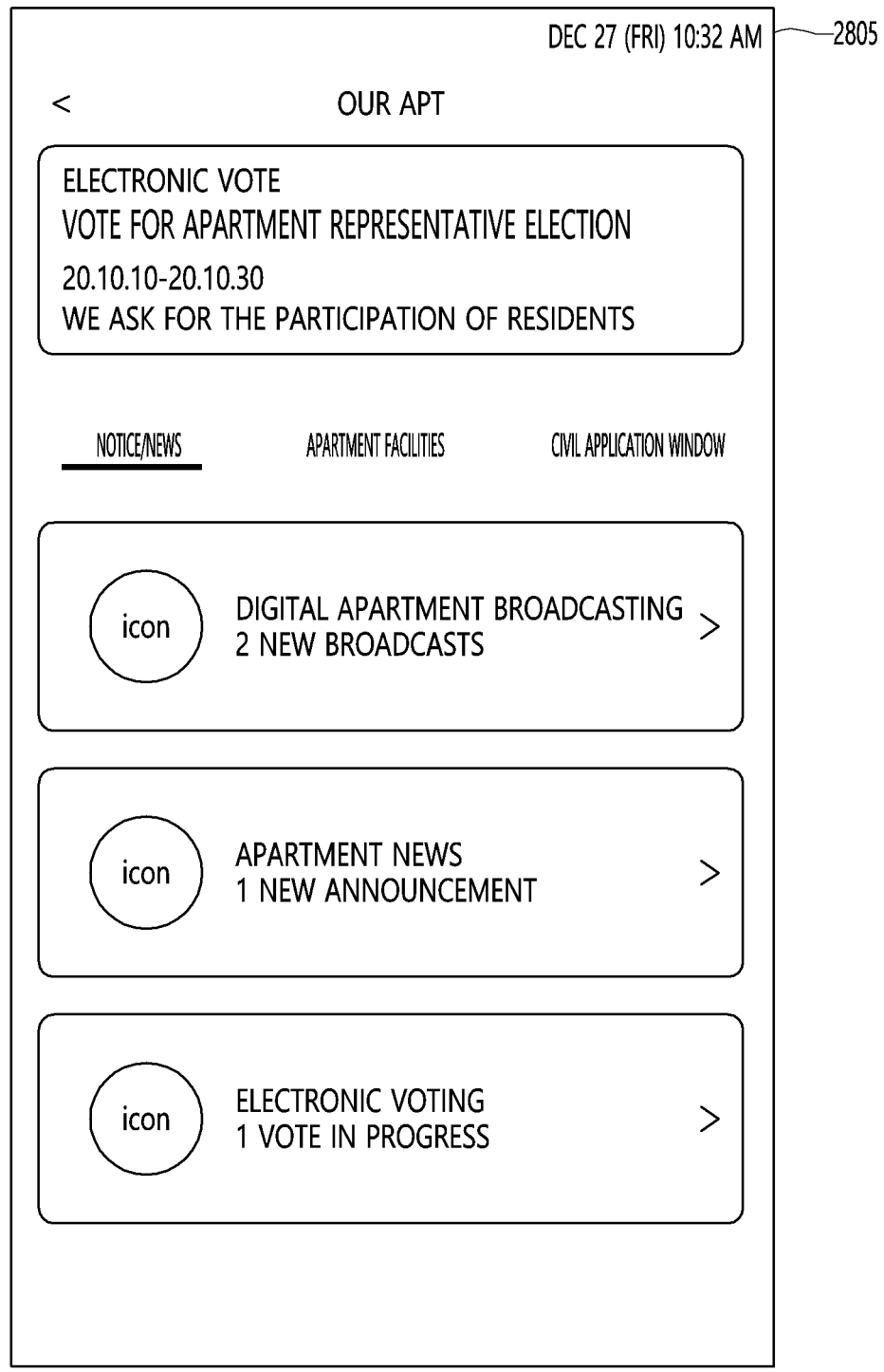
FIGS. 31 and 32 are views illustrating a residential news interface according to an embodiment of the present disclosure.

Referring to FIG. 31, the residence news interface 2805 may provide an interface for enabling the user to check residence news information.

Figure 32:
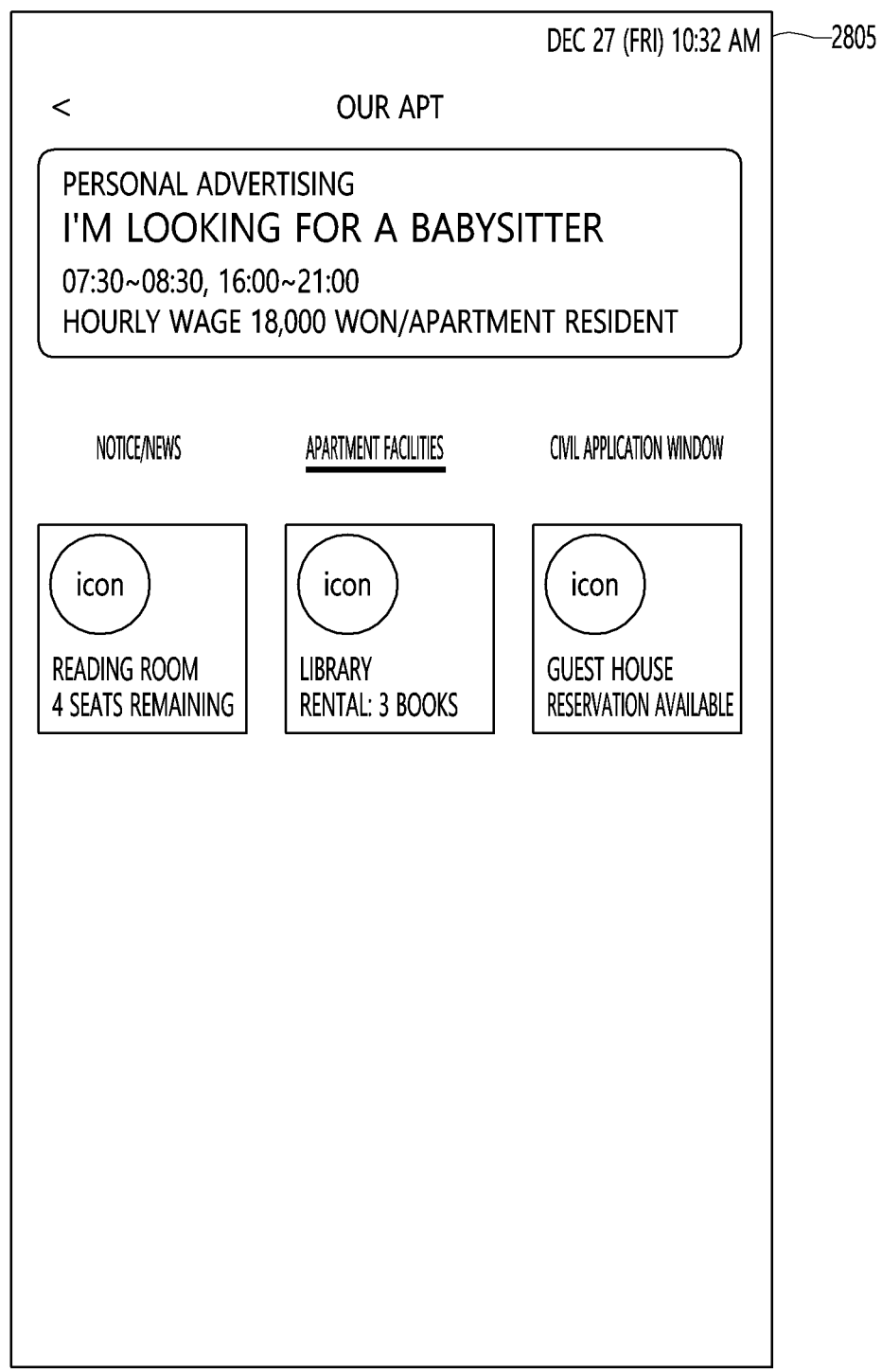

In addition, referring to FIG. 32, the residence news interface 2805 may provide an interface for checking information the facilities used in the residence.

In addition, the residence management information search interface 2801 may include a cost information interface 2806 for displaying cost information included in the residence management information.

Referring to FIGS. 33 and 34, the cost information interface 2806 may provide an interface for checking a cost incurring status related to the residence, checking cost charged by the residence service providers, and paying cost.

In addition, the residence management information search interface 2801 may include a residence service provider interface 2807 for displaying residence service providers included in the residence management information.

Figure 35:
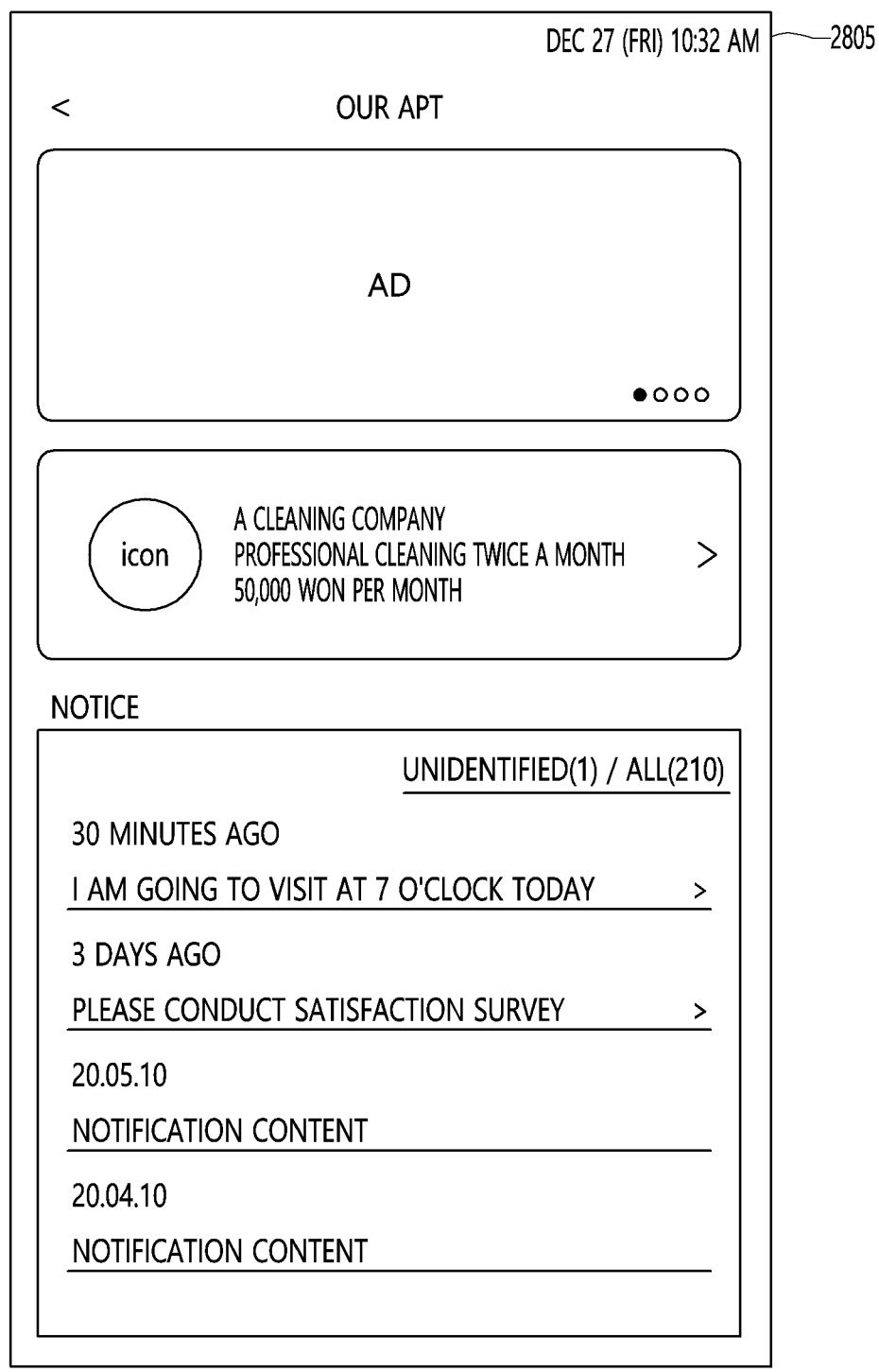
FIG. 35 is a view illustrating a residential service provider interface according to an embodiment of the present disclosure.

Referring to FIG. 35, the residence service provider interface 2807 may display information on the residence service provider and information on electronic mail transmitted by the residence service provider.

Meanwhile, the regional service provision device 200 according to the embodiment of the present disclosure may provide customized regional service information based on the user's residence.

In addition, the regional service provision device 200 according to the embodiment of the present disclosure may provide a variety of information related to the user's residence.

In addition, through the regional service provision device 200 according to the embodiment of the present disclosure, the user may search for and use information on the customized regional service provider related to their residence.

In addition, through the regional service provision device 200 according to the present disclosure, the user may search for and use information on the customized regional service provider related to their residence.

Meanwhile, the embodiment of the present disclosure provides a regional service provision device including a communication interface configured to receive a place search command from an artificial intelligence device of a user and a processor configured to obtain profile information of the user from a user profile information database in response to the place search command, obtain provider information of each of a plurality of regional service providers located within a predetermined radius based on residence information included in the user profile information, set an exposure order with respect to each of the plurality of provider information obtained based on provider location information, subscription information, provider popularity information and provider advertisement information included in the plurality of obtained provider information, and transmit the plurality of provider information with the exposure order to the artificial intelligence device through the communication interface.

In addition, the embodiment of the present disclosure provides a regional service provision device including a processor configured to determine a regional service provider, to which a user has subscribed, among a plurality of regional service providers and set an exposure order of provider information of a regional service provider, to which the user has subscribed, to be higher than that of provider information of a regional service provider, to which the user does not subscribe.

In addition, the embodiment of the present disclosure provides a regional service provision device including a processor configured to set an exposure order of provider information of each of a plurality of regional service providers in the order of the highest provider popularity based on provider popularity information of each of the plurality of regional service providers.

In addition, the embodiment of the present disclosure provides a regional service provision device including a processor configured to set provider information having highest advertisement cost as a highest exposure order based on advertisement information of each of the plurality of regional service providers.

In addition, the embodiment of the present disclosure provides a regional service provision device including a processor configured to determine a regional service provider, to which a user has subscribed, among a plurality of regional service providers and transmit advertisement information of the regional service provider, to which the user has subscribed, to an artificial intelligence device through a communication interface.

In addition, the embodiment of the present disclosure provides a regional service provision device including a processor configured to obtain order information associated with advertisement information from an artificial intelligence device through a communication interface and transmit the order information to a provider terminal corresponding to the order information through the communication interface.

In addition, the embodiment of the present disclosure provides a regional service provision device including a processor configured to receive order processing status information which is information on an order information processing status from a provider terminal through a communication interface and transmit the order processing status information to an artificial intelligence device.

In addition, the embodiment of the present disclosure provides a regional service provision device including a communication interface configured to receive an event search command from an artificial intelligence device and a processor configured to obtain provider event information of each of a plurality of regional service providers located within a predetermined radius based on residence information of a user, classify provider event information for each event tag information based on event tag information included in each provider event information, determine a frequency of frequent occurrence for each event tag information, and transmit event tag information, a frequency of frequent occurrence of the event tag information and provider event information classified as the event tag information to an artificial intelligence device through the communication interface.

In addition, the embodiment of the present disclosure provides a regional service provision device including a communication interface configured to obtain a residence management information search command from an artificial intelligence device and a processor configured to obtain residence management information associated with a user's residence from a residence management information database based on residence information of a user and transmit residence management information to an artificial intelligence device through the communication interface.

In addition, the embodiment of the present disclosure provides a regional service provision method including receiving a place search command from an artificial intelligence device of a user, obtaining profile information of the user from a user profile information database in response to the place search command, obtaining provider information of a plurality of regional service providers located within a predetermined radius based on residence information included in the user profile information, setting an exposure order with respect to each of the plurality of provider information obtained based on provider location information, subscription information, provider popularity information and provider advertisement information included in the plurality of obtained provider information, and transmitting the plurality of provider information with the exposure order to the artificial intelligence device through the communication interface.

In addition, the embodiment of the present disclosure provides a regional service provision method further including determining a regional service provider, to which a user has subscribed, among a plurality of regional service providers and transmitting advertisement information of the regional service provider, to which the user has subscribed, to an artificial intelligence device.

In addition, the embodiment of the present disclosure provides a regional service provision method further including receiving order information associated with advertisement information from an artificial intelligence device and transmitting the order information to a provider terminal corresponding to the order information.

In addition, the embodiment of the present disclosure provides a regional service provision method further including receiving order processing status information which is information on an order information processing status from a provider terminal and transmitting the order processing status information to an artificial intelligence device.

In addition, the embodiment of the present disclosure provides a regional service provision method including receiving an event search command from an artificial intelligence device, obtaining provider event information of each of a plurality of regional service providers located within a predetermined radius based on residence information of a user, classifying provider event information for each event tag information based on event tag information included in each provider event information, determining a frequency of frequent occurrence for each event tag information, and transmitting event tag information, a frequency of frequent occurrence of the event tag information and provider event information classified as the event tag information to an artificial intelligence device.

In addition, the embodiment of the present disclosure provides a regional service provision method further including obtaining a residence management information search command from an artificial intelligence device, obtaining residence management information associated with a user's residence from a residence management information database based on residence information of a user and transmitting residence management information to an artificial intelligence device.

The present disclosure may be embodied as computer-readable codes on a program-recorded medium. The computer-readable recording medium may be any recording medium that can store data which can be thereafter read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. The computer may also include the processor 180 of the artificial intelligence device.

What is claimed is:

1. An artificial intelligence device comprising:
  a communication interface configured to receive a visitor image captured via a camera associated with a door locking device; and a processor configured to:
  obtain visitor information from a visitor recognition model using the visitor image as input;
  select a home device among a plurality of home devices for transmitting the visitor image and the visitor information; and
  cause the communication interface to transmit the visitor image and the visitor information to the selected home device,
  wherein the processor is further configured to determine one or more home devices among the plurality of home devices which are currently in use,
  wherein the selected home device is selected from the one or more home devices currently in use based on a size of a display of each of the one or more home devices.

2. The artificial intelligence device of claim 1,
  wherein the communication interface is further configured to receive a door control command for the door locking device from the selected home device, and
  wherein the processor is further configured to cause the door locking device to be operated based on the door control command.

3. The artificial intelligence device of claim 1, wherein the processor is further configured to cause the door locking device to output voice data received from the selected home device through a speaker associated with the door locking device.

4. The artificial intelligence device of claim 1, wherein the processor is further configured to cause the door locking device to enter a safe mode for a predetermined time based on a failure to obtain visitor information using the visitor image.

5. The artificial intelligence device of claim 4, wherein the processor is further configured to:
  determine a length of time that an unidentified visitor remains while the door locking device is in the safe mode; and
  cause a speaker associated with the door locking device to output a notification based on the determined length of time exceeding a preset length of time.

6. The artificial intelligence device of claim 4,
  wherein the communication interface is further configured to receive audio data obtained by a microphone associated with the door locking device, and
  wherein the processor is further configured to cause a speaker associated with the door locking device to output a notification based on detection of a sound having a decibel level that is greater than or equal to a preset decibel level while the door locking device is in the safe mode.

7. The artificial intelligence device of claim 1, wherein the processor is further configured to cause the door locking device to enter a safe mode for a predetermined time when a visitor is not registered and a visit history includes a preset number of repeated visits by the visitor during a preset time.

8. The artificial intelligence device of claim 1, wherein:
  the communication interface is further configured to receive, from a first external door locking device, face information of a visitor who has been refused entry, and
  the processor is further configured to:
    cause the door locking device to enter a safe mode for a predetermined time when the visitor image matches face information of the visitor who has been refused entry; and
    transmit, via the communication interface, the face information of the visitor who has been refused entry to a second external door locking device.

9. The artificial intelligence device of claim 1,
  wherein the communication interface is further configured to receive a request for connection from a first home device to a second home device, and
  wherein the processor is further configured to:
    obtain a first communication protocol used by the first home device;
    obtain a second communication protocol used by the second home device; and
    transmit data received from the first home device to the second home device through the communication interface based on the first communication protocol and the second communication protocol.

10. The artificial intelligence device of claim 1, wherein the processor is further configured to:
  determine whether a visitor is a permitted member based on the visitor information;
  update history information of the permitted member; and
  obtain activity information of the permitted member based on the updated history information and operation information of the plurality of home devices.

11. The artificial intelligence device of claim 10, wherein the processor is further configured to detect abnormal activity based on activity information of the permitted member.

12. A method comprising:
  receiving a visitor image captured via camera associated with a door locking device;
  obtaining visitor information output from a visitor recognition model using the visitor image as input;
  selecting a home device among a plurality of home devices for transmitting the visitor image and the visitor information; and
  transmitting the visitor image and the visitor information to the selected home device,
  wherein the selecting of the home device comprises determining one or more home devices among the plurality of home devices which are currently in use, and wherein the selected home device is selected from the one or more home devices currently in use based on a size of the display of each of the one or more home devices.

13. The method of claim 12, further comprising:
  receiving a door control command for the door locking device from the selected home device; and
  causing operation of the door locking device based on the door control command.

14. The method of claim 12, further comprising causing the door locking device to enter a safe mode for a predetermined time based on a failure to obtain visitor information using the visitor image.

15. The method of claim 14, further comprising:
  determining a length of time that an unidentified visitor remains while the door locking device is in the safe mode; and
  causing a speaker associated with the door locking device to output a notification based on the determined length of time exceeding a preset length of time.

16. The method of claim 14, further comprising:
  receiving audio data obtained by a microphone associated with the door locking device; and
  causing a speaker associated with the door locking device to output a notification based on detection of a sound having a decibel level that is greater than or equal to a preset decibel level while the door locking device is in the safe mode.

17. The method of claim 12, further comprising:
causing the door locking device to enter a safe mode for a predetermined time when a visitor is not registered and a visit history includes a preset number of repeated visits by the visitor during a preset time.

18. The method of claim 12, further comprising:
receiving, from a first external door locking device, face information of a visitor who has been refused entry;
causing the door locking device to enter a safe mode for a predetermined time when the visitor image matches face information of the visitor who has been refused entry; and
transmitting, to a second external door locking device, the face information of the visitor who has been refused entry.

* * * * *